(12) United States Patent
Makino

(10) Patent No.: US 10,853,950 B2
(45) Date of Patent: Dec. 1, 2020

(54) MOVING OBJECT DETECTION APPARATUS, MOVING OBJECT DETECTION METHOD AND PROGRAM

(71) Applicant: NEC CORPORATION, Tokyo (JP)

(72) Inventor: Kengo Makino, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/537,733

(22) Filed: Aug. 12, 2019

(65) Prior Publication Data
US 2019/0362501 A1 Nov. 28, 2019

Related U.S. Application Data

(63) Continuation of application No. 15/876,276, filed on Jan. 22, 2018.

(30) Foreign Application Priority Data

Jan. 30, 2017 (JP) ................................. 2017-013871

(51) Int. Cl.
*G06K 9/00* (2006.01)
*G06T 7/20* (2017.01)
(Continued)

(52) U.S. Cl.
CPC ................ *G06T 7/20* (2013.01); *G06T 7/194* (2017.01); *G06T 7/215* (2017.01); *G06T 2207/20032* (2013.01); *G06T 2207/30232* (2013.01)

(58) Field of Classification Search
CPC ............ G06K 9/32; G06T 7/215; G06T 7/579
See application file for complete search history.

(56) References Cited

U.S. PATENT DOCUMENTS 5,157,732 A * 10/1992 Ishii ....................... G06T 7/223
382/107
5,748,775 A * 5/1998 Tsuchikawa ........ G06K 9/00369
375/E7.083

(Continued)

FOREIGN PATENT DOCUMENTS

JP 08241414 A 9/1996
JP 10-91795 A 4/1998

(Continued)

OTHER PUBLICATIONS

International Search Report and Written Opinion in International Application No. PCT/JP2018/002013, dated Apr. 24, 2018.

(Continued)

*Primary Examiner* — Avinash Yentrapati
(74) *Attorney, Agent, or Firm* — Sughrue Mion, PLLC

(57) ABSTRACT

There is provided a moving object detection technique capable of improving accuracy of detecting a moving object from video photographed by a moving camera. A moving object detection apparatus 10A according to an aspect of the present disclosure is provided with: a receiving portion 11 that receives video taken by an image capturing apparatus provided in a mobile body; a first calculation portion 13 that calculates first moving-object scores based on a motion of one or more pixels of image included in the video; a second calculation portion 15 that calculates second moving-object scores based on a background model and the image, wherein the background model is updated based on the image and the motions of the pixels; and a detection portion 16 that detects a moving object from the image based on the first scores and the second scores.

6 Claims, 12 Drawing Sheets

(51) Int. Cl.
*G06T 7/215* (2017.01)
*G06T 7/194* (2017.01)

(56) References Cited

U.S. PATENT DOCUMENTS

| | | | | | |
|---|---|---|---|---|---|
| 5,991,428 | A * | 11/1999 | Taniguchi | | G06K 9/3241 |
| | | | | | 348/155 |
| 6,501,794 | B1 * | 12/2002 | Wang | | H04N 19/17 |
| | | | | | 348/699 |
| 6,535,114 | B1 * | 3/2003 | Suzuki | | G06T 7/20 |
| | | | | | 340/435 |
| 6,819,778 | B2 * | 11/2004 | Kamei | | G06T 7/254 |
| | | | | | 382/103 |
| 6,876,999 | B2 * | 4/2005 | Hill | | G06K 9/32 |
| 7,136,525 | B1 * | 11/2006 | Toyama | | G06K 9/38 |
| | | | | | 382/173 |
| 7,825,954 | B2 * | 11/2010 | Zhang | | G01S 3/7864 |
| | | | | | 348/169 |
| 8,103,093 | B2 * | 1/2012 | Blake | | G06T 7/254 |
| | | | | | 382/164 |
| 8,812,226 | B2 * | 8/2014 | Zeng | | G01S 13/931 |
| | | | | | 701/301 |
| 10,140,555 | B2 * | 11/2018 | Takahashi | | G06K 9/627 |
| 2001/0046309 | A1 * | 11/2001 | Kamei | | G06T 7/215 |
| | | | | | 382/103 |
| 2002/0168091 | A1 * | 11/2002 | Trajkovic | | H04N 19/51 |
| | | | | | 382/107 |
| 2003/0210807 | A1 * | 11/2003 | Sato | | G08G 1/166 |
| | | | | | 382/104 |
| 2003/0219146 | A1 * | 11/2003 | Jepson | | G06T 7/251 |
| | | | | | 382/103 |
| 2004/0151342 | A1 * | 8/2004 | Venetianer | | G06T 7/11 |
| | | | | | 382/103 |
| 2006/0222205 | A1 * | 10/2006 | Porikli | | G06K 9/6212 |
| | | | | | 382/103 |
| 2006/0244866 | A1 * | 11/2006 | Kishida | | G06K 9/6218 |
| | | | | | 348/699 |
| 2007/0280540 | A1 * | 12/2007 | Ikeda | | G06T 7/254 |
| | | | | | 382/195 |
| 2008/0166045 | A1 * | 7/2008 | Xu | | G06T 7/251 |
| | | | | | 382/170 |
| 2008/0198237 | A1 * | 8/2008 | Smith | | G06T 7/215 |
| | | | | | 348/222.1 |
| 2008/0273751 | A1 * | 11/2008 | Yuan | | G06T 7/579 |
| | | | | | 382/103 |
| 2010/0067741 | A1 * | 3/2010 | Stolkin | | G06T 7/277 |
| | | | | | 382/103 |
| 2013/0071032 | A1 * | 3/2013 | Nishino | | G06T 7/254 |
| | | | | | 382/195 |
| 2013/0129205 | A1 * | 5/2013 | Wang | | G06K 9/6278 |
| | | | | | 382/164 |
| 2016/0371827 | A1 * | 12/2016 | Zhuang | | G06T 7/215 |
| 2017/0213100 | A1 | 7/2017 | Yun et al. | | |
| 2017/0278014 | A1 * | 9/2017 | Lessmann | | G06K 9/6267 |
| 2018/0204076 | A1 * | 7/2018 | Tripathi | | G06K 9/6269 |

FOREIGN PATENT DOCUMENTS

JP 2007188294 A 7/2007
JP 2007-323572 A 12/2007

OTHER PUBLICATIONS

Kwang Moo Yi, et al., "Detection of Moving Objects with Non-Stationary Cameras in 5.8ms: Bringing Motion Detection to your Mobile Device", IEEE, CV PR2013 Workshops, 2013, pp. 27-34.
Non-Final Office Action dated Jan. 10, 2020, issued by the United States Patent and Trademark Office in U.S. Appl. No. 15/876,276.
Notice of Allowance dated Apr. 29, 2020, which issued during the prosecution of U.S. Appl. No. 15/876,276.
Kimin Yun et al., "Robust and Fast Moving Object Detection in a Non-Stationary Camera via Foreground Probability Based Sampling", IEEE International Conference on Image Processing (ICIP), 2015, pp. 4897-4901 (5 pages total).

* cited by examiner

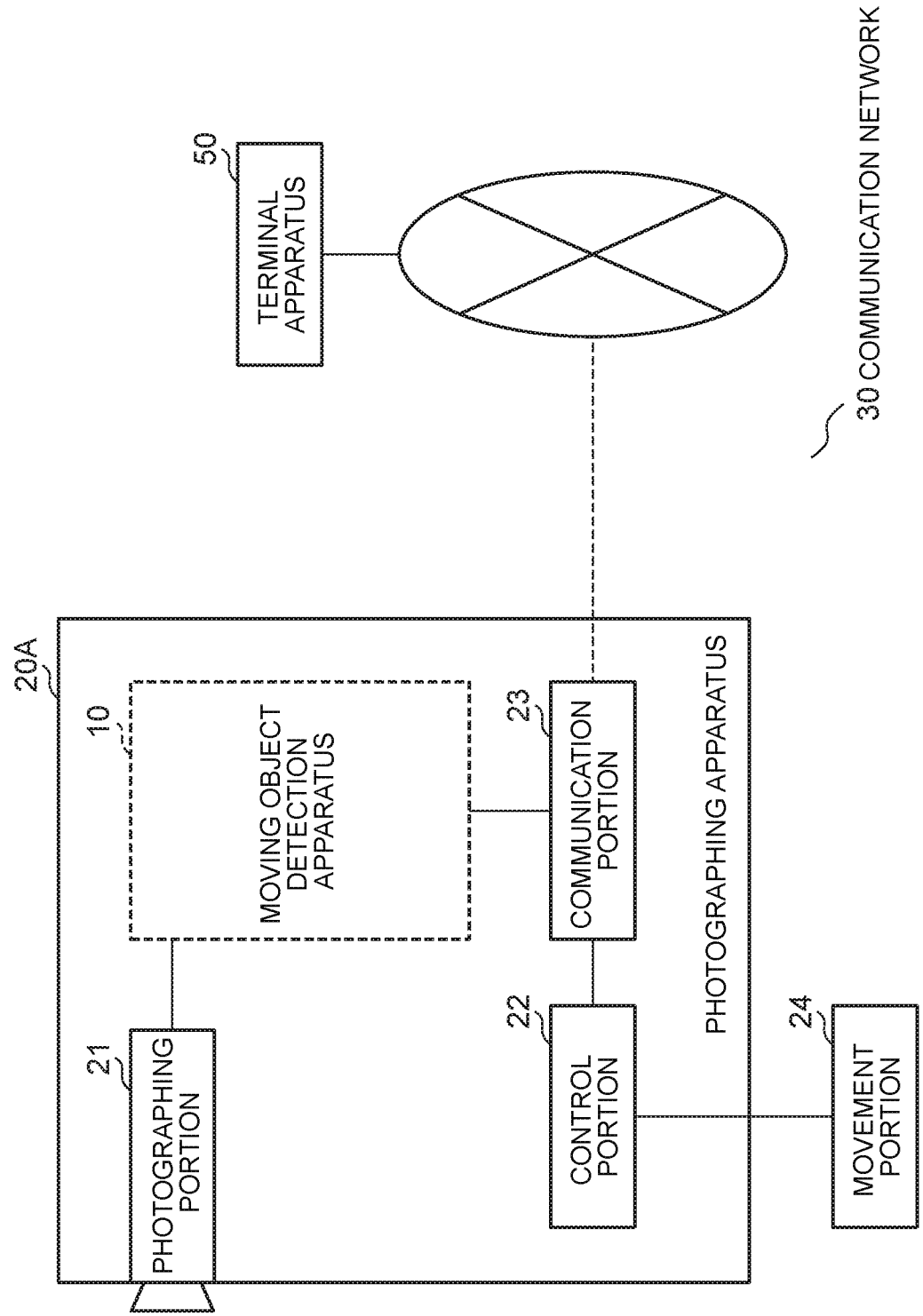

MOVING OBJECT DETECTION APPARATUS, MOVING OBJECT DETECTION METHOD AND PROGRAM

CROSS REFERENCE TO RELATED APPLICATIONS

This application is a Continuation of U.S. patent application Ser. No. 15/876,276 filed Jan. 22, 2018, which is claims priority to Japanese Patent Application No. 2017-013871 filed Jan. 30, 2017, the disclosure of which is incorporated herein in its entirety by reference.

BACKGROUND OF THE INVENTION

Technical Field

The present disclosure relates to a technique for detecting a moving object, and in particular to a technique for detecting a moving object in video taken by an image capturing apparatus that moves.

Background

In analysis of video obtained from a surveillance camera, a process for detecting a moving object is generally performed as a process at a preceding stage prior to performing an image recognition process and a process for tracking an object in an image. Recently, wearable cameras and cameras that can be mounted on a drone have become widespread. Therefore, a demand for detection of a moving object not only from video obtained by a fixed surveillance camera but also from video obtained by a camera performing photographing while moving as described above (hereinafter also expressed as video by a moving camera).

"Detection of Moving Objects with Non-Stationary Cameras in 5.8 ms: Bringing Motion Detection to your Mobile Device," Kwang Moo Yi et al., CVPR2013, Workshops, 2013 discloses a method for detecting a moving object from video by a moving camera. This method is a moving object detection method based on a statistical background subtraction method. In this method, a background model based on an average value, a variance and Age of pixel values is calculated for each of areas obtained by dividing each frame included in video in a grid pattern with a predetermined size. The background model is updated based on motion of pixels between frames. Then, detection of a moving object is performed based on difference between the newest frame in video and the background model.

Further, Japanese Patent Laid-Open No. H10-091795 describes an example of a moving object detection apparatus for detecting a moving object. The moving object detection apparatus of Japanese Patent Laid-Open No. H10-091795 divides each of time-series images inputted from a camera into a plurality of divided areas. The moving object detection apparatus calculates motion between continuous images for each of the divided areas. The moving object detection apparatus detects a plurality of divided areas that collectively make similar motion as a background and detects what is other than the background as a moving object.

Further, Japanese Patent Laid-Open No. 2007-323572 describes an object detection apparatus for detecting a stationary target object and a moving target object from a moving image in which a background changes. The object detection apparatus calculates a characteristic of each pixel of each image from time-series images inputted from a camera and accumulates the calculated characteristics. The object detection apparatus decides a state of each pixel (hereinafter also expressed as a pixel state) as any of pixel states of four patterns based on the accumulated characteristics. The pixel states of the patterns are: a short-term stable state (a stationary state), a short-term unstable state (a dynamic state), a long-term stable state (a continuous stationary state) and a long-term unstable state (a continuous dynamic state). The object detection apparatus adaptively switches a background model generation method for each pixel based on the decided pixel state. The object detection apparatus generates a background according to the adaptively switched generation method. Thereby, the object detection apparatus can detect only a moving object without false detection even if there is continuous motion (for example, shakes of a tree and sway of a water surface) in the background.

In the method of "Detection of Moving Objects with Non-Stationary Cameras in 5.8 ms: Bringing Motion Detection to your Mobile Device," a background model is constructed from inputted time-series images and updated based on motion. Then, an abnormal point that does not exist in the background model is detected as a moving object based on difference between a background image indicated by the background model and the newest image.

However, if a stationary object is newly included in a photographing range, for example, because of change in a visual point due to movement of a camera, the background model does not include information about the object. Therefore, such an object is falsely detected as a moving object though it is stationary.

Further, if a background has a complicated texture, a variance of a background model indicating the background increases. Therefore, when the background model and the newest image are compared, there are a lot of pixels that are included in a moving object but satisfy conditions for the background indicated by the background model. As a result, failure in detection of a moving object increases.

The object detection apparatus of Japanese Patent Laid-Open No. H10-091795 detects a moving object based on motion of each divided area. However, for example, in a case where there is a similar image pattern nearby and in a case where there is influence of noise and the like, accuracy of calculated motion of the divided area decreases. When the accuracy of the motion of the divided area decreases, accuracy of detection of a background decreases. When the accuracy of detection of the background decreases, accuracy of detection of a moving object also decreases.

The object detection apparatus of Japanese Patent Laid-Open No. 2007-323572 accumulates characteristics of each pixel in inputted time-series images and decides a pixel state based on the accumulated characteristics. The object detection apparatus adaptively switches a background model generation method based on the decided pixel state. However, if a camera moves, a target for which the pixel value of each pixel indicates luminance changes according to movement of the camera. Therefore, if the camera moves, the pixel state of each pixel cannot be said to indicate the nature of luminance of a target photographed as a background. Furthermore, all of the background model generation methods of Japanese Patent Laid-Open No. 2007-323572 are background model generation methods for a fixed background. Therefore, if a camera moves, that is, if a background is not fixed, it is not possible to generate a background model. Therefore, it is not possible to accurately detect a moving object using a background model generated by the technique of Japanese Patent Laid-Open No. 2007-323572.

As described above, it is not possible to accurately detect a background of video photographed by a moving camera based on the techniques of "Detection of Moving Objects with Non-Stationary Cameras in 5.8 ms: Bringing Motion Detection to your Mobile Device," Japanese Patent Laid-Open No. H10-091795 and Japanese Patent Laid-Open No. 2007-323572. Therefore, it is not possible to accurately detect a moving object from video photographed by a moving camera.

One of objects of the present disclosure is to provide a moving object detection apparatus and the like capable of improving accuracy of detecting a moving object from video photographed by a moving camera.

SUMMARY OF THE DISCLOSURE

A moving object detection apparatus according to an aspect of the present disclosure is provided with: a receiving unit that receives video taken by an image capturing apparatus provided in a mobile body; a first calculation unit that calculates first moving-object scores based on a motion of one or more pixels of an image included in the video; a second calculation unit that calculates second moving-object scores based on a background model and the image, wherein the background model is updated based on the image and the motions of the pixels; and a detection unit that detects a moving object from the image based on the first scores and the second scores.

A moving object detection method according to an aspect of the present disclosure includes: receiving video taken by an image capturing apparatus provided in a mobile body; calculating first moving-object scores based on a motion of one or more pixels of an image included in the video; calculating second moving-object scores based on a background model and the image, wherein the background model is updated based on the image and the motions of the pixels; and detecting a moving object from the image based on the first scores and the second scores.

A non-transitory computer readable medium have stored thereon a program according to an aspect of the present disclosure. The program causes a computer to execute: a receiving process for receiving video taken by an image capturing apparatus provided in a mobile body; a first calculation process for calculating first moving-object scores based on a motion of one or more pixels of an image included in the video; a second calculation process for calculating second moving-object scores based on a background model and the image, wherein the background model is updated based on the image and the motions of the pixels; and a detection process for detecting a moving object from the image based on the first scores and the second scores.

The present disclosure has an effect that it is possible to improve accuracy of detecting a moving object from video photographed by a moving camera.

BRIEF DESCRIPTION OF THE DRAWINGS

FIG. 15 is a diagram illustrating an example of a configuration of a photographing apparatus according to a modification of the first exemplary embodiment of the present disclosure.

DETAILED DESCRIPTION

Embodiments of the present disclosure will be described in detail with reference to drawings.

First Exemplary Embodiment

<<Description of Configuration>>

Figure 1:
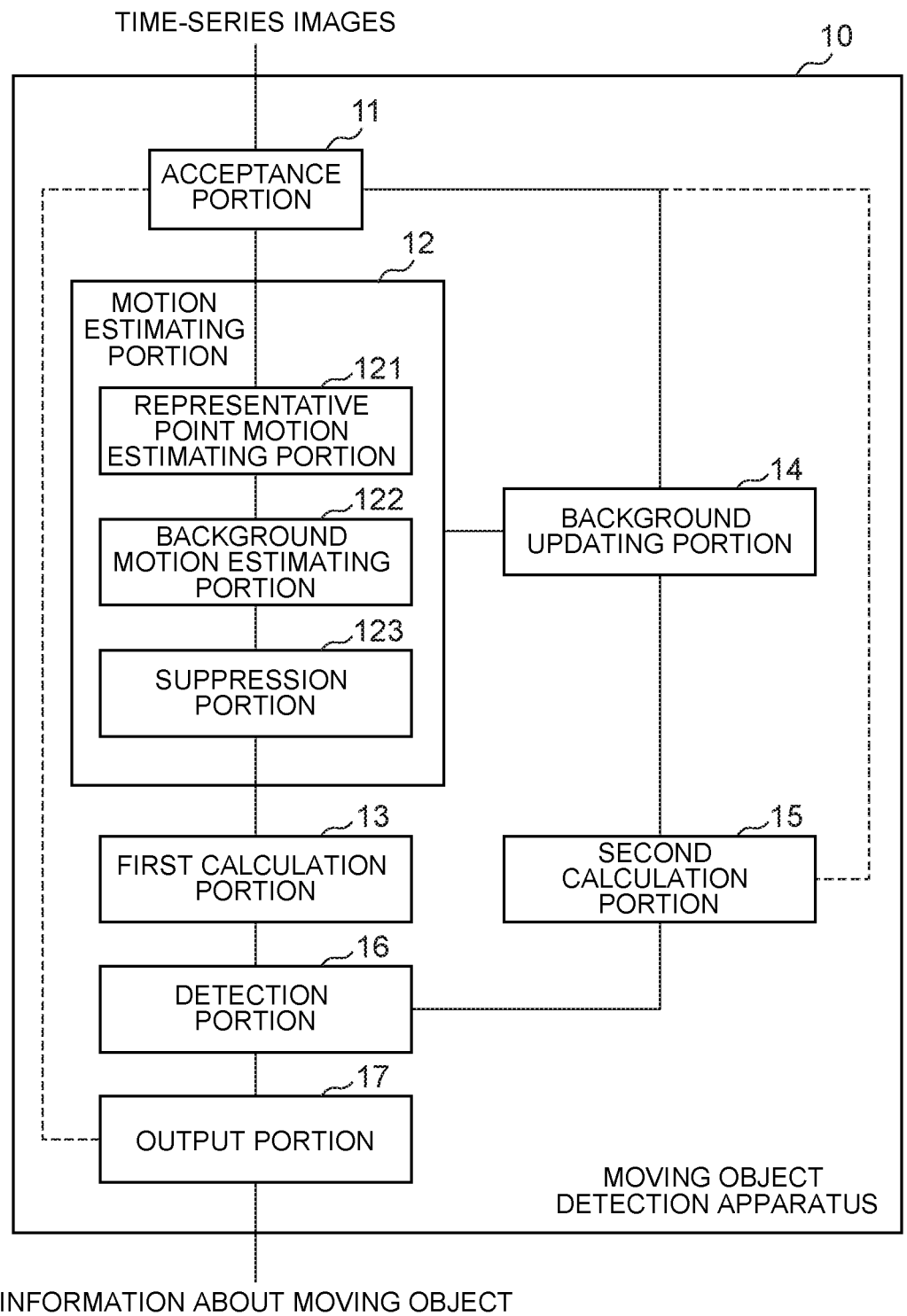
FIG. 1 is a block diagram illustrating a configuration of a moving object detection apparatus according to a first exemplary embodiment of the present disclosure.

FIG. 1 is a block diagram illustrating a configuration of a moving object detection apparatus according to a first exemplary embodiment of the present disclosure.

As illustrated in FIG. 1, a moving object detection apparatus 10 of the present exemplary embodiment includes a receiving portion 11, a motion estimating portion 12, a first calculation portion 13, a background updating portion 14, a second calculation portion 15, a detection portion 16 and an output portion 17.

The receiving portion 11 receives time-series images obtained from a camera. The time-series images indicate, for example, continuous still images photographed at predetermined time intervals. A format of the time-series images may be any form that makes it possible to individually take out images included in the time-series images. A format of the images may be any form that can be recognized by the moving object detection apparatus 10. In description below, the time-series images will be also expressed as video. The still images will be also expressed simply as images. The camera may transmit images included in photographed time-series images to the moving object detection apparatus 10 in order of acquisition.

The camera is, for example, a photographing apparatus mounted on a mobile body. The mobile body is, for example, a drone, a vehicle, a head mount display, a mobile terminal or the like. A movable mechanism may be incorporated in the camera. That is, the camera may be the mobile body. The mobile body is not limited to these examples.

Figure 14:
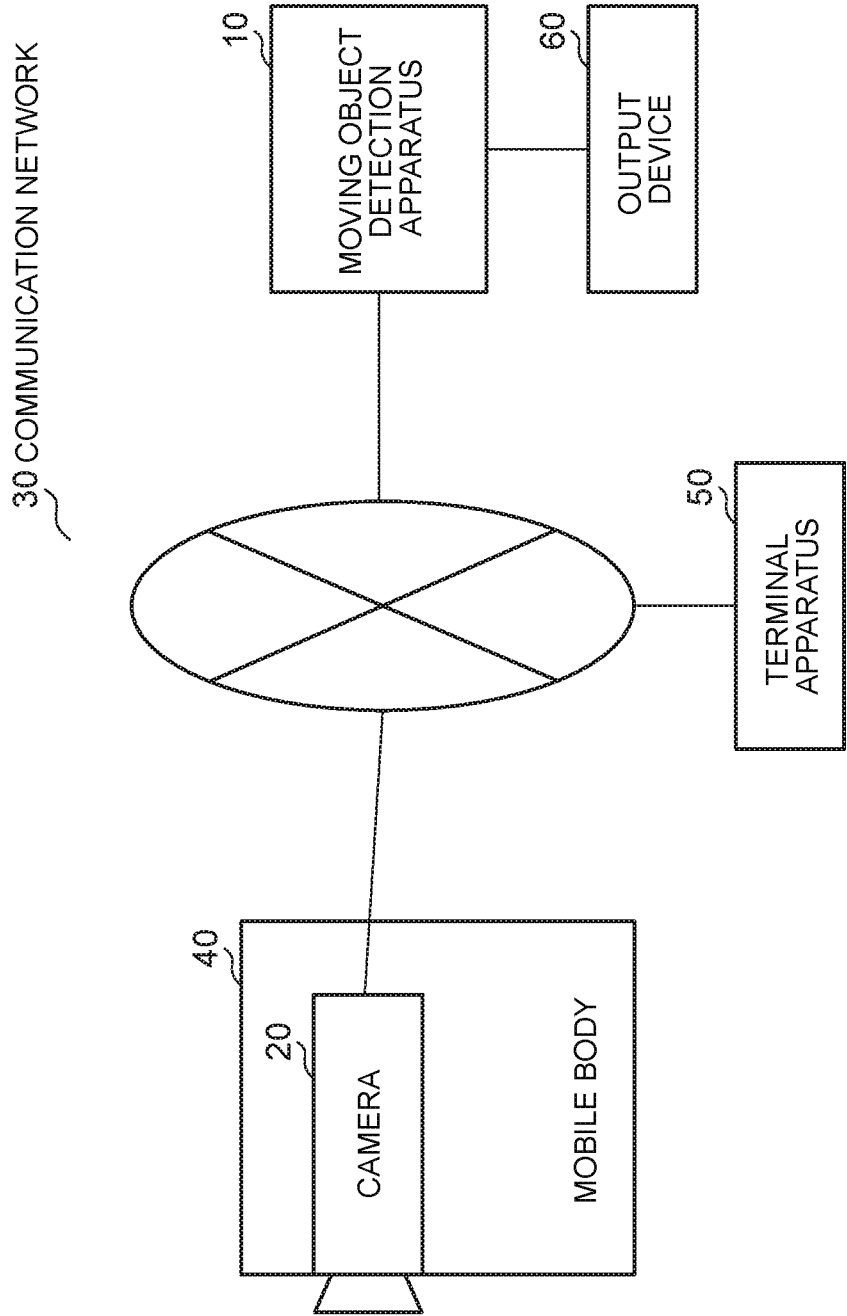
FIG. 14 is a diagram illustrating an example of an overall picture of the first exemplary embodiment of the present disclosure.

FIG. 14 is a diagram illustrating an example of a full picture of the present exemplary embodiment. In the example illustrated in FIG. 14, the moving object detection apparatus 10 is communicably connected to a camera 20 by wireless communication, wired communication or a combination of wireless communication and wired communication via a communication network 30. The camera 20 is mounted on a mobile body 40. For example, an output device 60 such as a display may be connected to the moving object detection apparatus 10. The moving object detection apparatus 10 may be connected to a terminal apparatus 50, for example, via the communication network 30. The terminal apparatus 50 is, for example, an apparatus provided with a function of displaying received information about a moving object, and the like. The terminal apparatus 50 may be, for example, a computer or a mobile terminal. The output portion 17 to be described later may transmit information about a detected moving object to the output device 60. The output portion 17 may transmit information about the detected moving object to the terminal apparatus 50.

The camera may include the moving object detection apparatus 10. The camera itself may operate as the moving object detection apparatus 10. That is, a controller, a processor or the like fitted in a housing of the camera may operate as the moving object detection apparatus 10. The mobile body may operate as the moving object detection apparatus 10. In the description below, the camera will be also expressed as a photographing apparatus.

The receiving portion 11 sends out images included in received time-series images to the motion estimating portion 12 and the background updating portion 14. In the description below, the receiving portion 11 sends out images included in received time-series images to the motion estimating portion 12 and the background updating portion 14 in chronological order. Then, the moving object detection apparatus 10 detects a moving object, for example, from an image sent out most newly (that is, lastly) among the images sent out by the receiving portion 11. In the description below, the image from which the moving object is detected will be also expressed as the newest image, the newest input image and a target image.

In the description of the present exemplary embodiment, the receiving portion 11 receives images included in time-series images from the camera in order of the images being photographed. Then, the receiving portion 11 sends out the images included in the time-series images to the motion estimating portion 12 and the background updating portion 14 in order of reception. The receiving portion 11 may hold a predetermined number of continuous images including a target image. The images held by the receiving portion 11 may include images photographed before the target image. The images held by the receiving portion 11 may include images photographed after the target image. The receiving portion 11 may send out all of the received time-series images to the motion estimating portion 12 and the background updating portion 14. In that case, for example, the motion estimating portion 12 may select a target image, for example, in chronological order from among the time-series images. The motion estimating portion 12 may notify an identifier of the selected target image to the background updating portion 14. Each portion of the moving object detection apparatus 10 can perform processing assuming that the image selected as a target image is an image from which a moving object is detected.

The motion estimating portion 12 estimates motions (for example, optical flows) at representative points from the images included in the continuous images received by the receiving portion 11. The representative points are, for example, pixels determined in advance.

The first calculation portion 13 calculates, for example, moving-object scores at the representative points (hereinafter also expressed as first scores) based on the estimated motions (for example, optical flows) at the representative points. A moving-object score indicates a degree of possibility that a pixel is included in a moving object area.

The background updating portion 14 updates a background model based on the newest input image. The background model indicates information about a background in the newest input image. The information about a background will be described below. The background updating portion 14 transmits the newest input image and the updated background model to the second calculation portion 15. The second calculation portion 15 calculates moving-object scores (hereinafter also expressed as second scores) based on a result of comparison between the received background model and input image.

The detection portion 16 detects a moving object from the newest input image based on the moving-object scores calculated by the first calculation portion 13 (the first scores) and the moving-object scores calculated by the second calculation portion 15 (the second scores). The detection portion 16 may, for example, detect a moving object from the newest input image based on the first scores and detect a moving object from the newest input image based on the second scores. The detection portion 16 may integrate the moving object detected based on the first scores and the moving object detected based on the second scores and detect the integrated moving object as a final moving object.

The output portion 17 outputs information about the detected moving object. For example, the output portion 17 may overlap display indicating an area of the detected moving object on the newest input image and output the newest input image on which the display of the moving object is overlapped. For example, the output portion 17 may overlap display indicating an area except the area of the detected moving object on the newest input image and output the input image on which the display indicating the area except the area of the moving object is overlapped. Various formats can be adopted as a format of the image of the outputted moving object.

Further, the motion estimating portion 12 includes a representative point motion estimating portion 121, a background motion estimating portion 122 and a suppression portion 123. The representative point motion estimating portion 121 calculates motions (for example, optical flows) of a plurality of representative points in the newest input image, for example, based on the newest input image and a reference image. Hereinafter, the optical flows of the representative points will be also expressed as representative flows. A reference image of an input image may be, for example, an input image before the input image. An input image before the newest input image is, for example, an image which is a predetermined number of images before the newest input image in chronological order among the time-series images described before. The input image before the newest input image has been sent to the motion estimating portion 12 by the receiving portion 11 prior to the newest input image. The input image before the newest input image may be an image immediately before the newest input image in chronological order among the time-series images. The reference image may be an image after the newest input image in chronological order among the time-series images. In that case, the receiving portion 11 may supply the newest input image and the reference image to the representative point motion estimating portion 121 of the motion estimating portion 12. The representative point motion estimating portion 121 can calculate representative flows based on the received newest input image and reference image.

The background motion estimating portion 122 estimates motion of a background area (optical flows of the background area) based on the representative flows. The optical flows of the background area will be also expressed as background flows.

The suppression portion 123 suppresses components of the background flows in the representative flows. The suppression portion 123 calculates optical flows (local flows) from which the components of the background flows have been removed from the representative flows, for example, by subtracting the background flows from the representative flows. In the description below, the optical flows obtained by canceling the components of the background flows from the representative flows will be also expressed as local flows.

The receiving portion 11 will be described in more detail.

The receiving portion 11 receives time-series images obtained from the camera. The time-series images may be inputted to the receiving portion 11 from the camera that has photographed the time-series images. A storage device or a server that stores the time-series images may input the time-series images to the receiving portion 11. The receiving portion 11 may read out the time-series images stored in the storage device or the server. The receiving portion 11 may correct the received time-series images by image processing such as filtering processing. Specifically, the receiving portion 11 may perform the above correction for each of images included in the received time-series images. The correction may be, for example, noise removal. For example, the receiving portion 11 may apply, to each of the images included in the time-series images, a Gaussian filter with a pixel size of 5×5 after applying a median filter with a pixel size of 3×3 in order to reduce noise. Further, the receiving portion 11 sends out the received time-series images to the motion estimating portion 12 and the background updating portion 14. Specifically, for example, the receiving portion 11 may send out the images included in the received time-series images to the representative point motion estimating portion 121 of the motion estimating portion 12 and the background updating portion 14 in chronological order. The receiving portion 11 may furthermore send out the time-series images to the second calculation portion 15. The receiving portion 11 may send out the time-series images to the second calculation portion 15 via the background updating portion 14. The receiving portion 11 may furthermore send out the time-series images to the output portion 17. The receiving portion 11 may send out the time-series images to the output portion 17 via the motion estimating portion 12, the first calculation portion 13 and the detection portion 16.

The motion estimating portion 12 will be described in more detail. As described above, the motion estimating portion 12 includes the representative point motion estimating portion 121, the background motion estimating portion 122 and the suppression portion 123.

Figure 2:
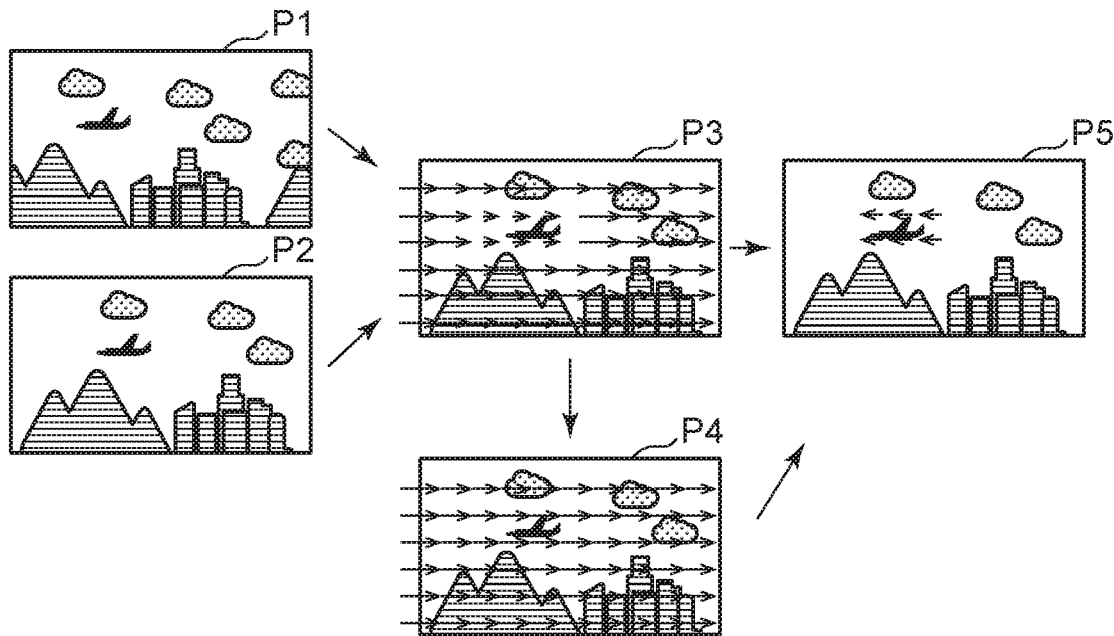
FIG. 2 is a diagram schematically illustrating an example of motion obtained in a process of processing of a motion estimating portion according to the first exemplary embodiment of the present disclosure.

FIG. 2 is a diagram schematically illustrating an example of motion obtained in a process of processing of the motion estimating portion 12.

The representative point motion estimating portion 121 sets representative points in the newest input image received from the receiving portion 11 and estimates points of a reference image corresponding to the set representative points. If the reference image is an image before the newest input image, the representative point motion estimating portion 121 can calculate motions from the points corresponding to the representative points to the representative points as optical flows. If the reference image is an image after the newest input image, the representative point motion estimating portion 121 can calculate motions from the representative points to the points corresponding to the representative points as optical flows. The representative point motion estimating portion 121 can set the representative points according to a method set in advance. The representative point motion estimating portion 121 may set the representative points, for example, in a manner that the representative points may be arranged at predetermined intervals in each of vertical and horizontal directions. The vertical-direction interval and the horizontal-direction interval may be different. The representative point motion estimating portion 121 may set the representative points in a manner that pixels at ends of the image are not set as representative points. The representative point motion estimating portion 121 may set, for example, a point at a center of each of areas obtained by dividing the input image at predetermined cycles in the vertical and horizontal directions as the representative points. For example, it is assumed that a size of the input image is 1920×1080 pixels, an input image associated with time T is the newest input image, an image associated with time T−1 is a reference image, a horizontal-direction cycle is 32 pixels, and a vertical-direction cycle is 24 pixels. In this case, the representative point motion estimating portion 121 sets a total of 2700 representative points, the horizontal-direction cycle of which is 32 pixels and the vertical-direction cycle of which is 24 pixels, in the input image associated with the time T. Then, the representative point motion estimating portion 121 refers to the image associated with the time T−1 and calculates optical flows at the representative points (that is, representative flows). The image associated with the time T may be, for example, an image photographed at the time T. The image associated with the time T may be, for example, an image received by the motion estimating portion 12 at the time T. The image associated with the time T may be an image photographed after the time T after a predetermined image included in the time-series images (for example, an image at the top) is photographed. As a method for calculating the optical flows, a method can be used in which peripheral pixels with a representative point as a center are treated as an image patch, and the least squares method, the cross correction maximization method, the Lucas-Kanade method or the like is used. An image P1 illustrated in FIG. 2 is the image associated with the time T−1 (hereinafter expressed as a frame T−1), and an image P2 is the image associated with the time T (hereinafter expressed as a frame T). An image P3 indicates an example of a result of calculated representative flows.

The background motion estimating portion 122 estimates optical flows in a background area based on representative flows under an assumption that a background area is dominant in each image included in time-series images (for example, the area of the background area occupies more than half of the area of an input image). Specifically, the background motion estimating portion 122 calculates a transformation matrix for performing motions indicated by representative flows, to representative points. In the description of the present exemplary embodiment, the matrix for performing motions indicated by representative flows, to representative points in an input image is the transformation matrix. The background motion estimating portion 122 may, however, calculate a matrix for performing motions indicated by representative flows, from representative points in an input image as the transformation matrix.

The background motion estimating portion 122 estimates a transformation matrix, for example, so that coordinates in the case of transforming coordinates of either start points or end points of vectors indicating representative flows using the transformation matrix (transformed coordinates) are brought close to coordinates of the start points or the end points that are remaining (reference coordinates). As an indicator of closeness between the transformed coordinates and the reference coordinates, for example, a Euclidean distance can be applied. Other distances may be used as the closeness indicator. The representative flows include vectors indicating motions at the plurality of representative points. Among the representative points, representative points included in a moving object area exist. Furthermore, the representative flows do not necessarily show accurate motions because of influence of noise and the like. Therefore, it is difficult to calculate a transformation matrix that causes the transformation coordinates and reference coordinates described above to mutually correspond at all the representative points. The background motion estimating portion 122 can estimate a transformation matrix, for example, so that a sum total of the Euclidean distances between the transformed coordinates and the reference coordinates at the plurality of representative points becomes small.

If a background area is dominant in each image included in time-series images, the rate of occupation of flows caused by motion of a background among representative flows becomes higher than the rate of flows in an area except the background. In other words, more than half of flows among flows included in the representative flows indicate background flows. The background motion estimating portion 122 may calculate a transformation matrix by a method which is not easily influenced by outliers. As described above, if a background area is dominant in an input image, the rate of occupation of flows derived from the background area among representative flows becomes higher among representative flows. In that case, if a transformation matrix is calculated by the method which is not easily influenced by outliers, flows derived from the area except the background area correspond to outliers on the representative flows. In the case of calculating a transformation matrix by the method which is not easily influenced by outliers, contribution of the flows derived from the area except the background area to the transformation matrix is smaller in comparison with contribution of the flows derived from the background area. In other words, the background motion estimating portion 122 can calculate a transformation matrix for performing motions indicated by the flows derived from the background area. The background motion estimating portion 122 estimates background flows indicating motions of the background at the representative points based on the calculated transformation matrix.

The transformation matrix may be a transformation matrix for affine transformation. The transformation matrix may be a transformation matrix for nomography. For example, a user of the moving object detection apparatus 10 may select the kind of transformation matrix according to a scene to be photographed. The background motion estimating portion 122 can estimate a transformation matrix based on representative flows and background flows based on the transformation matrix, for example, using the least squares method or the like. The background motion estimating portion 122 can reduce influence of flows of representative points that are not included in a background area by performing an optimization calculation method that is not easily influenced by outliers, such as a RANSAC (random sample consensus) algorithm and a least median estimation method. In this case, for example, by flows at representative points included in a moving object area and flows at representative points near the moving object area being treated as outliers, accuracy of estimation of background flows can be increased.

For example, the RANSAC algorithm is a robust optimization method that is not easily influenced by outliers. Therefore, under the assumption described above, optical flows of representative points inside and near a moving object area are not used at the time of optimization calculation because they are regarded as outliers. Then, optimization calculation is performed using only optical flows of representative points in a background area. The transformation matrix calculated by the background motion estimating portion 122 associates pixels of the frame T with pixels of the frame T−1 corresponding to the pixels of the frame T. In other words, this transformation matrix indicates transformation between coordinates of the pixels of the frame T and coordinates of the pixels of the frame T−1 corresponding to the pixels of the frame T. Specifically, this transformation matrix transforms the coordinates of the pixels of the frame T−1 to coordinates of pixels of the frame T. Therefore, by transforming coordinates of representative points set in the frame T based on this transformation matrix (specifically, by an inverse matrix of this transformation matrix), coordinates of points in the frame T−1 corresponding to the representative points can be calculated. The background motion estimating portion 122 calculates vectors from the points in the frame T−1 corresponding to the representative points set in the frame T to the representative points corresponding to the points as background flows at the representative points. The calculated background flows indicate flows caused by motion of the camera. The background motion estimating portion 122 supplies the estimated transformation matrix to the background updating portion 14 to be described in detail later.

In the example illustrated in FIG. 2, an image P4 indicates an example of background flows estimated based on the image P3 indicating representative flows. The background flows are different from the representative flows especially inside and near a moving object area.

The suppression portion 123 calculates local flows obtained by removing components of background flows estimated by the background motion estimating portion 122 from representative flows calculated by the representative point motion estimating portion 121. Specifically, the suppression portion 123 can calculate vectors obtained by removing components of vectors indicating the background flows from vectors indicating the representative flows as vectors of the local flows. The suppression portion 123 can calculate vectors obtained by subtracting the vectors of the background flows from the vectors of the representative flows at the representative point, as the local flows.

In the example illustrated in FIG. 2, an image P5 indicates an example of the local flows obtained by subtracting the background flows illustrated in the image P4 from the representative flows illustrated in the image P3. Since the moving object moves differently from that of the background, difference between representative flows and background flows in the background area is smaller than difference between representative flows and background flows in the moving object area if accuracy of the calculated background flows is high. Local flows in the moving object area and near the moving object area have a remarkable length in comparison with local flows in the background area. Furthermore, difference between a direction of the local flows in the moving object area and near the moving object area and a direction of the local flows in the background area is also remarkable.

In addition to a local flow at each representative point, the suppression portion 123 calculates a local flow at each of pixels other than representative points in an input image, for example, by interpolation. As a method for interpolation, a bilinear method, a bicubic method and the like are applicable. The suppression portion 123 can calculate a local flow at each of pixels other than representative points in an input image by interpolation. The suppression portion 123 sends and supplies the calculated local flows to the first calculation portion 13.

The first calculation portion 13 receives the local flows from the suppression portion 123, and calculates moving-object scores based on information about the received local flows (for example, magnitude of motion (an amount of movement), a direction of the motion, and the like) (that is, first scores as described above). The first calculation portion 13 may calculate the first scores only based on local flows in the newest input image. The first calculation portion 13 may calculate the first scores based on the local flows in the newest input image and local flows in a past input image.

As described above, the image P5 in FIG. 2 indicates an example of calculated local flows. As illustrated in P5, the local flows are flows generated by removing components of background flows from representative flows. Therefore, magnitude of local flows in and near a moving object area is larger in comparison with magnitude of local flows in a background area. As disclosed in Japanese Patent Laid-Open No. H10-091795 also, a method of detecting an object that makes motion different from that of a background by removing components of background flows from representative flows is already known. However, there may be a case where magnitude of local flows in a background area is larger when compared with magnitude of other local flows in the background area because of influence of noise. Therefore, for example, if, based on only local flows in one image, a moving-object score dependent on magnitude of the local flows is calculated, there may be a case where a score equal to a score in a moving object area is calculated in an area in a background area where noise and the like has occurred. However, a possibility that equal noise continuously occurs in the same area is not strong. It is expected that local flows caused by noise are not stably detected in continuous images. If motion of a moving object does not change, for example, so abruptly that it becomes significantly different between continuous frames of a moving image, local flows by the moving object are expected to be similar in the continuous frames. In order to prevent a problem that an area where noise has occurred is detected as a moving object area, the first calculation portion 13 may calculate a score based on similarity of local flows in continuous images as a moving-object score, for example, under an assumption that the way of motion of a moving object does not abruptly change.

Figure 3:
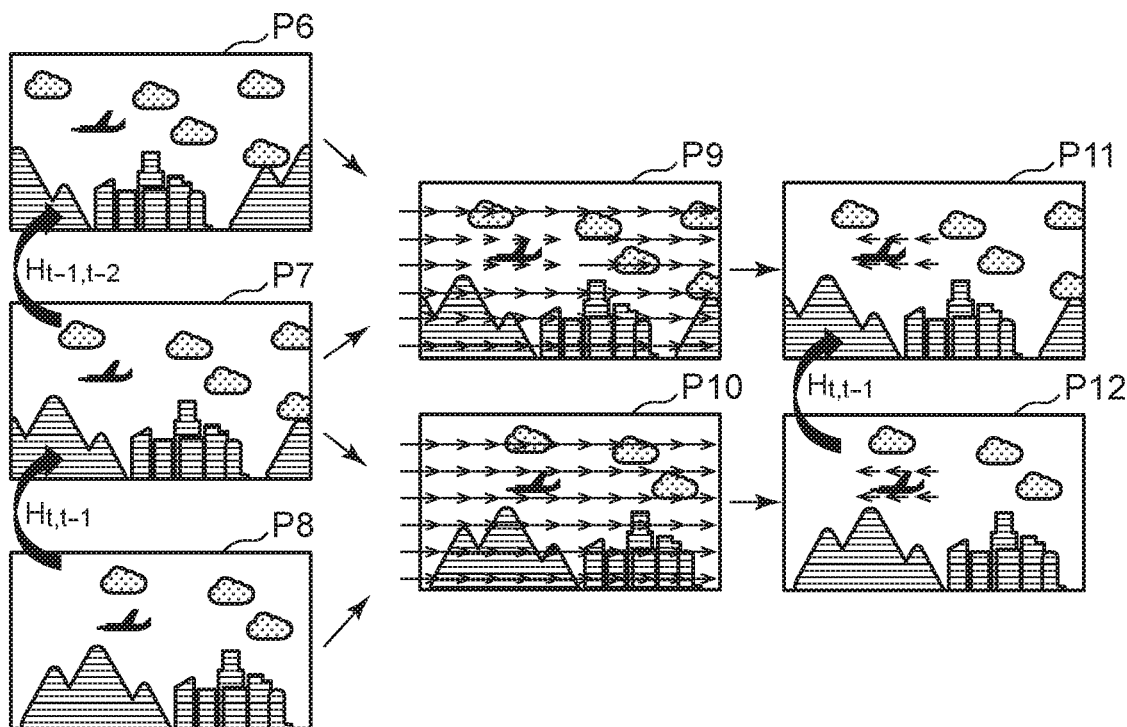
FIG. 3 is a diagram schematically illustrating inputted images and a flow of being calculated in a process until first scores are calculated according to the first exemplary embodiment of the present disclosure.

FIG. 3 is a diagram schematically illustrating inputted images and a flow of being calculated in a process until first scores are calculated. In FIG. 3, images P6, P7 and P8 are input images at time (T−2), at time (T−1) and at the time T. An image P9 indicates an image obtained by overlapping representative flows calculated from the images P6 and P7 on the image P7. An image P10 indicates an image obtained by overlapping representative flows calculated from the images P7 and P8 on the image P8. An image P11 indicates an image obtained by overlapping local flows calculated based on the representative flows illustrated in the image P9 on the image P7. An image P12 indicates an image obtained by overlapping local flows calculated based on the representative flows illustrated in the image P10 on the image P8. Further, it is assumed that a transformation matrix between the images P6 and P7 calculated in a process of calculating background flows is $H_{t-1, t-2}$, and a transformation matrix between the images P7 and P8 is $H_{t, t-1}$. Like images P11 and P12 illustrated in FIG. 9, local flows in moving object areas in continuous images face in almost the same direction. Therefore, difference between angles of local flows in the moving object areas in the continuous images is small.

In the present exemplary embodiment, the camera moves during photographing. At the time of calculating the angle difference described above, a transformation matrix calculated by the background motion estimating portion 122 is used so that the angle difference can be calculated among the same objects in a plurality of images even when a background is moving because of movement of the camera. If a background is moving because of movement of the camera, a pixel j of the image P11 and a pixel j of the image P12 are generally pixels where different points in three-dimensional space (three-dimensional coordinates) in a real world are projected. It is necessary to calculate a pixel where the same point as the point in the three-dimensional space projected to the pixel j of the image P11 is projected (that is, a corresponding pixel) in the image P12. In this case, the first calculation portion 13 can calculate coordinates of the corresponding pixel described above by performing coordinate transformation of the pixel using the transformation matrix described before.

For example, the first calculation portion 13 can perform transformation for causing coordinates of points in one of continuous images to correspond to coordinates of points in the other image corresponding to the points, for local flows. The transformation is indicated by a transformation matrix calculated in the process of calculating background flows. The first calculation portion 13 can perform transformation for local flows by a transformation matrix calculated in the process of calculating background flows. The first calculation portion 13 may calculate scores based on difference between angles of the transformed local flows in the images, as first scores. The first calculation portion 13 can calculate the first score, for example, according to such a calculation method that a score is higher as magnitude of the difference between angles of local flows (0 degree to 180 degrees) is smaller.

A score M indicated by a formula $M=1-d\theta'$ is an example of the first score. As an example of calculating a score from an angle difference result, $d\theta'$ is a value that is normalized so that a range of the value may be from 0 to 1 by dividing magnitude $d\theta$ of difference between angles of local flows by 180 in this formula. Furthermore, by setting a value of the score M as $M=1-d\theta'$, magnitude of the score M is larger as the magnitude of difference between angles of local flows is smaller. The first calculation portion 13 may calculate an average value (expressed as a score L) of scores M calculated from a predetermined number of (for example, five) images as the first score. In this case, in a background area, magnitudes of difference between angles of local flows are distributed between 0 degree and 180 degrees, for example, randomly. Therefore, scores M are distributed between 0 and 1, for example, randomly. In this case, values of the score L, which is the average value of the scores M, are distributed around 0.5. In a moving object area, magnitudes of difference between angles of local flows are distributed near 0 degree. Therefore, scores M are distributed near 1. Therefore, values of the score L are distributed near 1.

The background updating portion 14 receives a transformation matrix from the background motion estimating portion 122 of the motion estimating portion 12. Similarly to the technique described in "Detection of Moving Objects with Non-Stationary Cameras in 5.8 ms: Bringing Motion Detection to your Mobile Device," the background updating portion 14 transforms a background model, for example, based on a transformation matrix indicating transformation from coordinates of pixels of an immediately previous input image to coordinates of pixels of the newest input image. The background model is required only to include, for example, coordinates indicating a position in an image that is set in advance, and a value indicating a characteristic of a luminance value of a pixel in a background at the position indicated by the coordinates. The background model will be described later in detail. Specifically, the background updating portion 14 can transform a background model, for example, by transforming coordinates included in the background model by a received transformation matrix. The coordinates after the transformation are not limited to integers. The background updating portion 14 can calculate, from the coordinates after the transformation and a value indicating a characteristic of a luminance value of a pixel of a background at the coordinates, a characteristic of a luminance value of a pixel of the background at a position indicated by coordinates set in advance, for example, by interpolation. Transformation of coordinates, and transformation of a background model including calculation of a characteristic of a luminance value at a position indicated by coordinates set in advance, for example, by interpolation may be expressed as "motion compensation" for the background model. The background updating portion 14 furthermore causes a new input image to be reflected on the background model. That is, the background updating portion 14 updates the background model based on information about the new input image. Specifically, the background updating portion 14 updates the characteristic of the luminance value included in the background model, for example, using a luminance value of a pixel of the new input image. More specifically, the background updating portion 14 updates the background model, for example, by performing weighted addition average between the value indicating the characteristic included in the background model after transformation and the value indicating a characteristic calculated from the new input image.

The background model is, for example, data indicating a characteristic of a luminance value of a background at a position of each pixel of the newest input image. The background model may be data that includes, for example, a model including an average value of luminance values and a variance of the luminance values, for each pixel. That is, the background model may be data in which coordinates, and the average value of luminance values and the variance of the luminance values are associated for each pixel. The background model may include a standard deviation instead of a variance. The background model may furthermore include the number of pieces of data for each pixel. The number of pieces of data indicates the number of luminance values used for calculation of the average value of luminance values and the variance of the luminance values. For example, the background updating portion 14 can reflect luminance values of a new input image on the average value and the variance of luminance values included in the background model. The background updating portion 14 can furthermore add 1 to the number of pieces of data. The background updating portion 14 may transform the background model by applying the method for motion compensation for background model described in "Detection of Moving Objects with Non-Stationary Cameras in 5.8 ms: Bringing Motion Detection to your Mobile Device" under an assumption that a luminance value of each pixel is distributed according to Gaussian distribution. Furthermore, the background updating portion 14 may update the background model by applying the background model update method described in "Detection of Moving Objects with Non-Stationary Cameras in 5.8 ms: Bringing Motion Detection to your Mobile Device."

The background model may include a model (for example, the average value and variance described above) for each of areas obtained by dividing an image by a grid with a predetermined size (hereinafter expressed as a grid square). As described above, the background model (specifically, a model included in the background model) may include a standard deviation instead of a variance. The background updating portion 14 may transform the background model according to the method for motion compensation for background model described in "Detection of Moving Objects with Non-Stationary Cameras in 5.8 ms: Bringing Motion Detection to your Mobile Device." Furthermore, the background updating portion 14 may update the background model according to the background model update method described in "Detection of Moving Objects with Non-Stationary Cameras in 5.8 ms: Bringing Motion Detection to your Mobile Device."

Figure 4:
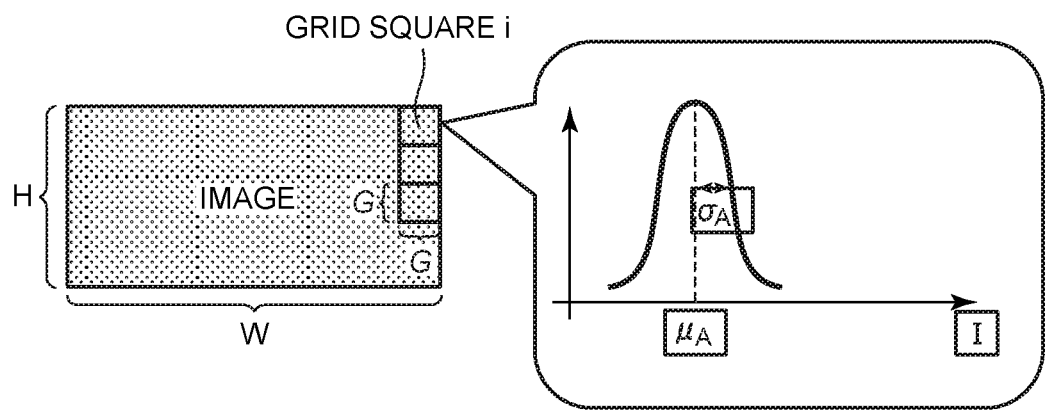
FIG. 4 is a diagram schematically illustrating examples of a grid square and a model according the first exemplary embodiment of the present disclosure.

FIG. 4 is a diagram schematically illustrating an example of the grid square and model described above. In the example illustrated in FIG. 4, the size of the grid (that is, the grid square size) is G×G. A grid square i is a grid square to which a number i is given. FIG. 4 illustrates that luminance values of pixels of a background included in the grid square i are distributed according to Gaussian distribution in which an average value is µA and a standard deviation is σA. In a graph illustrated on the right side of FIG. 4, a horizontal axis indicates luminance values, and a vertical axis indicates frequency. In this case, a background model includes the average value and the standard deviation as a model for the grid square i.

Such a model can be used to judge whether a luminance value of a pixel included in the grid square i is abnormal or not. For example, if a luminance value of a pixel included in the grid square i deviates from the model for the grid square i, for example, if magnitude of difference between the average value of the model for the grid square i and the luminance value is larger than the standard deviation of the grid square i, the pixel can be detected as an abnormal point.

Figure 5:
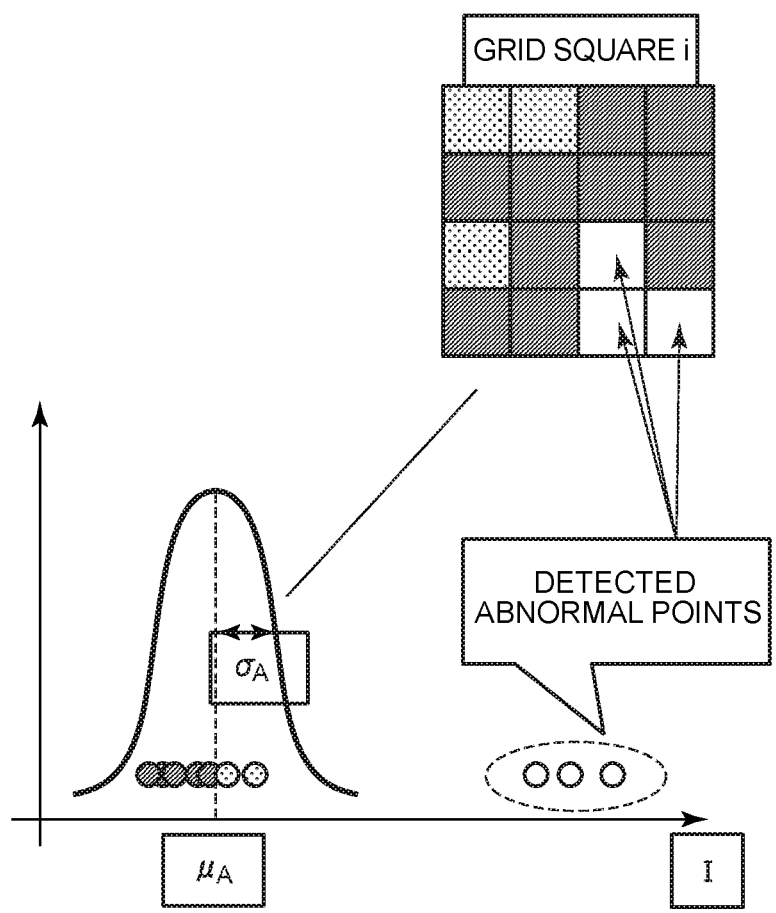
FIG. 5 is a diagram schematically illustrating pixel values of pixels included in the grid square and a grid square model therefor.

FIG. 5 is a diagram schematically illustrating luminance values of pixels included in the grid square and a grid square model therefor. In the example illustrated in FIG. 5, the grid square i is an area with 4×4 pixels. One square in the grid square indicates one pixel. Luminance values of pixels indicated by white squares indicate pixels deviating from the model for the grid square i. In the graph illustrated in FIG. 5, a horizontal axis indicates luminance values, and a vertical axis indicates frequency. Further, small circles illustrated in the graph indicate distribution of the luminance values of the pixels in the grid square. In the case of detecting abnormal points based on the model, pixels indicated by white squares are detected as the abnormal points.

In a case where a background model does not exist (for example, in a case where the newest input image is the first image of time-series images), the background updating portion 14 can generate a background model, for example, based on the newest input image. For example, as an average value for a model for pixels included in a background model, the background updating portion 14 may set an average value of luminance values of pixels of the newest input image corresponding to the pixels. The background updating portion 14 may set, for example, zero as a variance for the model for the pixels included in the background model.

The second calculation portion 15 calculates a moving-object score in each pixel of the newest input image (hereinafter also expressed as a second score) using a background model updated by the background updating portion 14 and the newest input image sent out by the receiving portion 11. The second calculation portion 15 may calculate an abnormality degree described below as a moving-object score. In the present exemplary embodiment, the abnormality degree is, for example, a value obtained by dividing a square d2 of difference between an average value of luminance values and luminance values of a pixel of an input image by a variance V (hereinafter expressed as a score A). The score A is indicated by Formula A=d2/V (here, "/" indicates an operator of division). The second calculation portion 15 can calculate the score A as the second score for each of the pixels of the newest input image. The background model is not limited to the example described above. The background model is required only to be a model indicating a characteristic of a luminance value when a pixel is included in a background. The second score is not limited to the example described above. The second score is required only to be a value indicating deviation between a luminance value of a pixel and a background model.

The detection portion 16 detects a moving object in the newest input image based on the moving-object scores calculated by the first calculation portion 13 (the first scores) and the moving-object scores calculated by the second calculation portion 15 (the second scores). More specifically, the detection portion 16 judges whether each pixel of the newest input image is included in a moving object area or not based on the first scores and the second scores. The detection portion 16 may detect an area obtained by connecting pixels judged to be included in the moving object area as the moving object area.

The detection portion 16 may detect a moving object based on the first scores, for example, using a threshold for the first scores (expressed as a first threshold). Specifically, for example, if first scores of pixels included in a moving object are smaller than the first threshold, the detection portion 16 can detect an area obtained by connecting the pixels the first scores of which are smaller than the first threshold, as the moving object. An area of the moving object detected based on the first scores will be expressed as a first area. Furthermore, the detection portion 16 may detect a moving object based on the second scores, for example, using a threshold for the second score (expressed as a second threshold). Specifically, for example, if second scores of pixels included in a moving object are smaller than the second threshold, the detection portion 16 can detect an area obtained by connecting the pixels the second scores of which are smaller than the second threshold, as the moving object. An area of the moving object detected based on the second scores will be expressed as a second area. The detection portion 16 may integrate the first and second areas and detect an area obtained by integrating the first and second areas as a moving object area. A logical product of the first and second areas (that is, an area that is included in both of the first and second areas) may be the area obtained by integrating the first and second areas. A logical sum of the first and second areas (that is, an area that is included in at least one of the first and second areas) may be the area obtained by integrating the first and second areas. A different area based on the first and second areas may be the area obtained by integrating the first and second areas.

The detection portion 16 may integrate a first score and a second score and detect a moving object based on scores obtained by the integration (hereinafter also expressed as integrated scores). An integrated score may be a weighted linear sum of a first score and a second score. The integrated score may be coordinates of a point, for example, in space in which a vertical axis indicates first scores and a horizontal axis indicates second scores (hereinafter expressed as score space) (that is, coordinates (first score, second score)).

For example, if an integrated score of a pixel satisfies a judgment criterion for integrated score, the detection portion 16 may judge that the pixel is included in a moving object area. The judgment criterion for integrated score may be indicated, for example, by an area in the score space. For example, if an integrated score obtained by integrating first and second scores of a pixel is included in the area set in the score space, the detection portion 16 may judge that the pixel is included in a moving object area. If the integrated score is not included in the area set in the score space described above, the detection portion 16 may judge that the pixel is not included in the moving object area.

Figure 6:
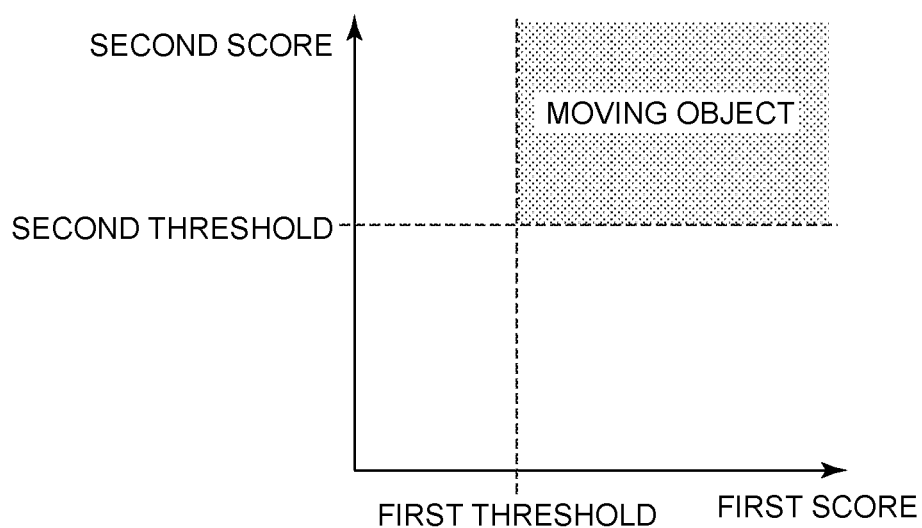
FIG. 6 is a diagram schematically illustrating an example of judgment criteria for integrated score.

FIG. 6 is a diagram schematically illustrating an example of the judgment criterion for integrated score. In the example illustrated in FIG. 6, if a first score of a pixel is larger than the first threshold, and a second score of the pixel is larger than the second threshold, the detection portion 16 judges that the pixel is included in a moving object area.

Figure 7:
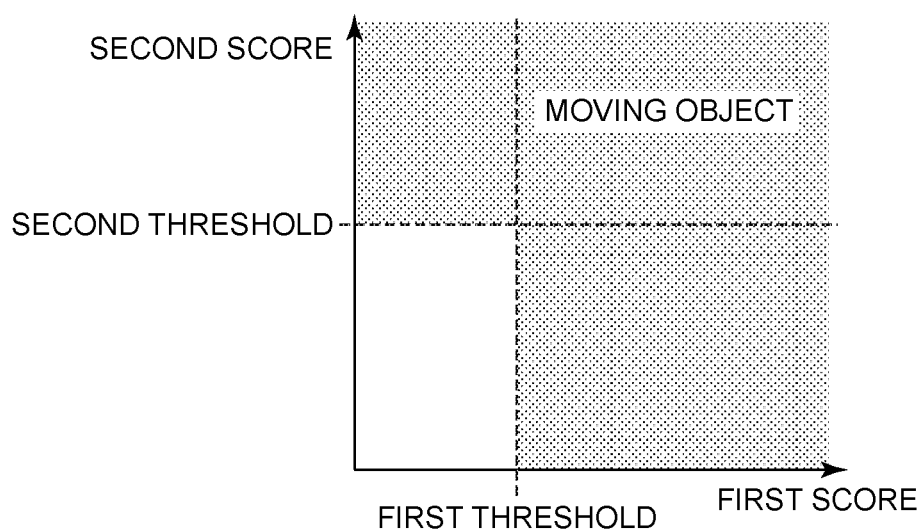
FIG. 7 is a diagram schematically illustrating an example of the judgment criteria for integrated score.

FIG. 7 is a diagram schematically illustrating an example of the judgment criterion for integrated score. In the example illustrated in FIG. 7, if a first score of a pixel is larger than the first threshold, the detection portion 16 judges that the pixel is included in a moving object area regardless of a value of a second score of the pixel. Furthermore, if the second score of the pixel is larger than the second threshold, the detection portion 16 also judges that the pixel is included in the moving object area regardless of a value of the first score of the pixel.

Figure 8:
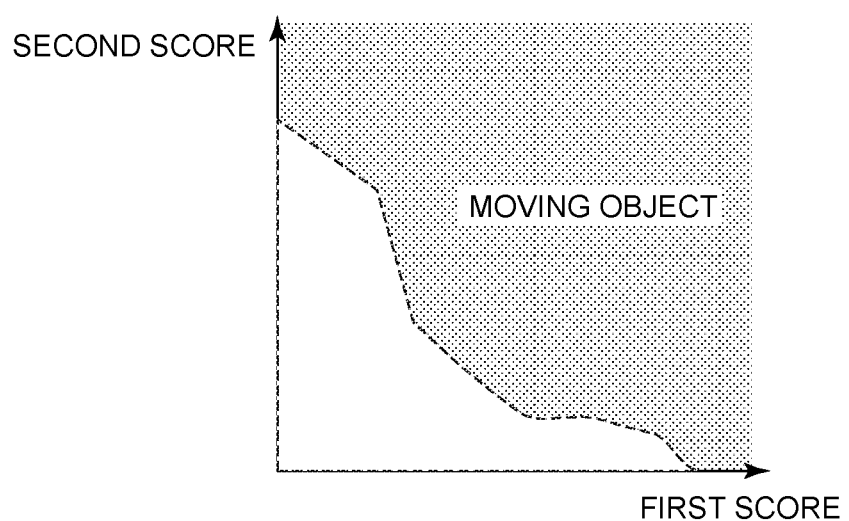
FIG. 8 is a diagram schematically illustrating an example of the judgment criteria for integrated score.

FIG. 8 is a diagram schematically illustrating an example of the judgment criterion for integrated score. In the example illustrated in FIG. 8, if an integrated score of a pixel exists outside a border line indicated by a broken line (an area that does not include the origin of the score space), the detection portion 16 judges that the pixel is included in a moving object area. Further, if the integrated score of the pixel exists inside the border line indicated by the broken line (an area that includes the origin of the score space), the detection portion 16 judges that the pixel is not included in the moving object area.

<<Description of Operation>>

Operation of the moving object detection apparatus 10 of the present exemplary embodiment will be described in detail with reference to drawings.

Figure 9:
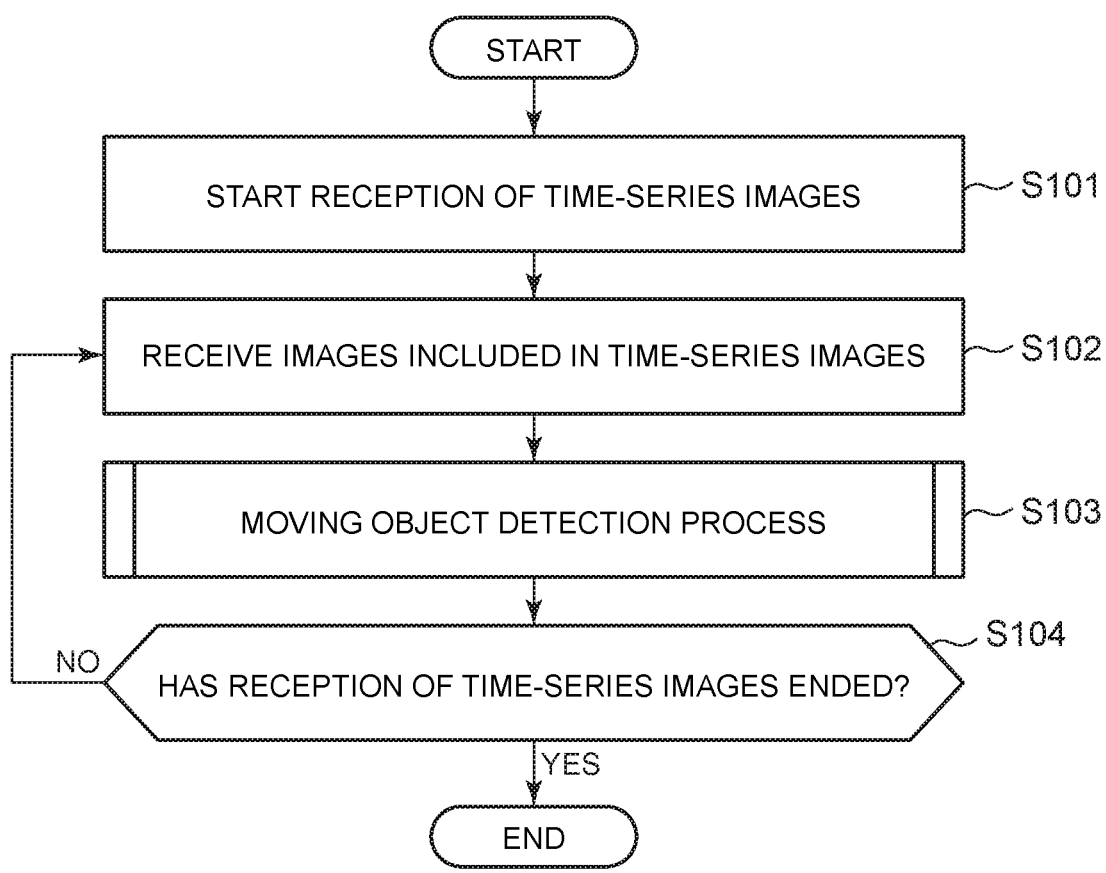
FIG. 9 is a flowchart illustrating an example of operation of the moving object detection apparatus according to the first exemplary embodiment of the present disclosure.

FIG. 9 is a flowchart illustrating an example of the operation of the moving object detection apparatus 10 of the exemplary embodiment.

The receiving portion 11 starts reception of time-series images obtained from the camera (step S101). If an image is sent from the camera, the receiving portion 11 can start reception of the time-series images. The receiving portion 11 may start reception of the time-series images, for example, according to an instruction from the terminal apparatus 50. The receiving portion 11 receives images included in the time-series images (step S102). The receiving portion 11 sends out the received images to the motion estimating portion 12 and the background updating portion 14. The moving object detection apparatus 10 executes a moving object detection process (step S103). The moving object detection process will be described later in detail. If an image that has not been selected exists in the time-series images (NO at step S104), the moving object detection apparatus 10 repeats operation at and after step S102. If reception of the time-series images ends (YES at step S104), the moving object detection apparatus 10 ends the operation illustrated in FIG. 9. The receiving portion 11 may end reception of the time-series images, for example, if transmission of an image from the camera stops. The receiving portion 11 may end reception of time-series images, for example, according to an instruction from the terminal apparatus 50.

Operation of the moving object detection process of the moving object detection apparatus 10 of the present exemplary embodiment will be described in detail with reference to drawings.

Figure 10:
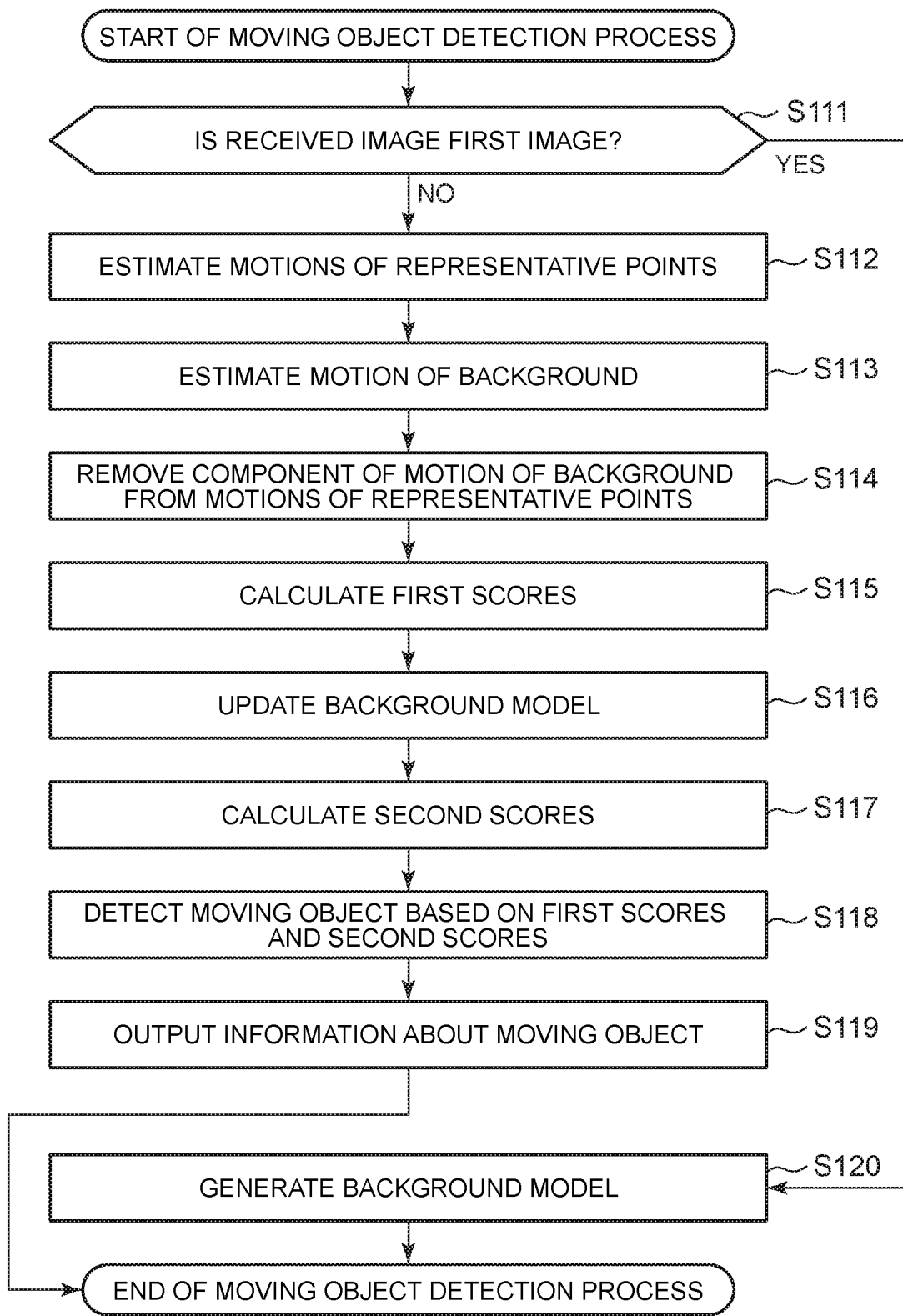
FIG. 10 is a flowchart illustrating an example of operation of a moving object detection process of the moving object detection apparatus according to the first exemplary embodiment of the present disclosure.

FIG. 10 is a flowchart illustrating an example of the operation of the moving object detection process of the moving object detection apparatus 10 of the exemplary embodiment.

If a received image, that is, an image sent out by the receiving portion 11 to the motion estimating portion 12 and the background updating portion 14 is the first image of time-series images (YES at step S111), the background updating portion 14 generates a background model (step S120). For example, if a background model does not exist, the background updating portion 14 may judge that the received image is the first image of time-series images. For example, if an image that can be used as a reference image has not been received, the motion estimating portion 12 may judge that the received image is the first image of time-series images. In that case, the motion estimating portion 12 may cause the received image to be a reference image to be compared with an image received next. Then, the moving object detection process ends the operation illustrated in FIG. 10.

If the image selected by the receiving portion 11 is not the first image of time-series images (NO at step S111), the moving object detection apparatus 10 performs operation at and after step S112.

The representative point motion estimating portion 121 of the motion estimating portion 12 estimates motions of representative points the positions of which are set in advance in the selected image, that is, the newest input image described above, as representative flows (step S112). The background motion estimating portion 122 of the motion estimating portion 12 estimates motion of a background (step S113). That is, the background motion estimating portion 122 estimates a transformation matrix for associating two images from the representative flows and estimates background flows based on the estimated transformation matrix (step S113). Then, the suppression portion 123 of the motion estimating portion 12 calculates local flows by removing components of the background flows from the representative flows (step S114).

The first calculation portion 13 calculates moving-object scores (that is, first scores) based on the calculated local flows (step S115).

The background updating portion 14 updates a background model based on the transformation matrix estimated by the background motion estimating portion 122 and the newest input image (step S116). Specifically, the background updating portion 14 updates the background model by performing motion compensation for the background model using the transformation matrix and, furthermore, causing the newest image to be reflected on the background model (step S116).

The second calculation portion 15 calculates moving-object scores (that is, second scores) based on the updated background model and the newest input image (step S117).

The detection portion 16 detects a moving object based on the first scores and the second scores (step S118). The detection portion 16 may integrate a first score and a second score and detect the moving object based on the integrated scores.

The output portion 17 outputs information about the detected moving object (step S119). The output portion 17 may output the newest input image in which an area of the moving object is shown (hereinafter also expressed as an output image). The output portion 17 may generate, for example, an image obtained by overlapping display (for example, a figure) indicating the area of the detected moving object on the newest input image is overlapped as the output image. The output portion 17 may generate an image obtained by changing at least one of color and brightness of the area of the detected moving object in the newest input image, as the output image. The output portion 17 may generate an image obtained by changing at least one of color and brightness of area except the area of the detected moving object in the newest input image, as the output image. Then, the moving object detection apparatus 10 ends the operation illustrated in FIG. 10.

Effects

The present exemplary embodiment has an effect that it is possible to improve accuracy of detecting a moving object from video photographed by the camera that is moving (hereinafter also expressed as a representative effect).

The reason is that the detection portion 16 detects a moving object based on first scores calculated by the first calculation portion 13 and second scores calculated by the second calculation portion 15. The first scores and the second scores are different kinds of scores indicating a degree of possibility that a pixel is included in a moving object, for which influence of movement of a background due to movement of the camera has been reduced. By the detection portion 16 detecting a moving object based on scores of the two kinds, it is possible to reduce false detection and excessive detection in comparison with the case of detecting a moving object based on scores of one kind, and therefore, accuracy of detecting a moving object is improved.

The present exemplary embodiment also has the first to fourth effects described below.

The first effect is that, even if a new stationary object appears because of change in a visual point accompanying movement of the camera, false detection can be reduced. A second score based on a background model is a score based on an abnormality degree of a luminance value against a background model. A first score based on an optical flow in video is a score based on actual motion of an object. As for a stationary object that appears because of change in a visual point, the detection portion 16 can judge, by these scores of the two kinds, that the object "is not a moving object because it does not actually move, even if it is abnormal."

The second effect is that, when a moving object is detected based on only second scores using a background model, it is possible to improve a moving object detection rate even when a moving object cannot be detected because of complicatedness of a background. There may be a case where, even when there are few points deviating from a background model, optical flows can be calculated between images included in time-series images. If the optical flows can be calculated, the detection portion 16 can judge that "an object is a moving object because it is moving, though an abnormality degree is not high" even when there are few points deviating from a background model among points included in an area of the moving object area.

The third effect is that, when a moving object is detected based on only first scores using optical flows, it is possible to reduce false detection of a moving object even when false detection of a moving object occurs because optical flow estimation accuracy is bad. If an abnormality degree of second scores using a background model is apparently low, the detection portion 16 can judge, even if remarkable values are calculated as optical flows, that an object "is not a moving object because an abnormal object apparently does not exist". That is, in this case, the detection portion 16 can judge that a moving object does not exist.

The fourth effect is that only a moving object can be detected from video photographed by the camera that is moving. The reason is that the suppression portion 123 removes components of motion of a background estimated based on motions of representative points from the motions of the representative points. Therefore, the suppression portion 123 can reduce influence of motion of a background caused by movement of the camera on motion of the whole image. Furthermore, since the background updating portion 14 performs motion compensation for a background model using a transformation matrix indicating motion of a background corresponding to motion of the camera, the background updating portion 14 can perform background update following the motion of the background caused by the movement of the camera. By detecting a moving object using first scores based on motion of a target included in an image for which influence of motion of a background has been reduced and second scores based on a background model following the motion of the background, it is possible to detect motion of a moving object that makes a motion different from that of the background.

Modification of First Exemplary Embodiment

A modification of the first exemplary embodiment of the present disclosure will be described in detail with reference to drawings.

FIG. 15 is a diagram illustrating an example of a configuration of a photographing apparatus 20A according to the modification of the first exemplary embodiment of the present disclosure.

The photographing apparatus 20A includes the moving object detection apparatus 10, a photographing portion 21, a control portion 22 and a communication portion 23. The photographing apparatus 20A is connected to the terminal apparatus 50, for example, by wireless communication, wired communication or a combination of wireless communication and wired communication via a communication network 30.

The moving object detection apparatus 10 is the same as the moving object detection apparatus 10 of the first exemplary embodiment illustrated in FIG. 1. The photographing apparatus 20A may not include the moving object detection apparatus 10 as one apparatus. The photographing apparatus 20A may include, for example, each portion of the moving object detection apparatus 10 illustrated in FIG. 1. In other words, the photographing apparatus 20A may operate as described above as the moving object detection apparatus 10 of the first exemplary embodiment.

The photographing portion 21 is a device that performs photographing and outputs time-series images obtained by the photographing. The photographing portion 21 corresponds to the camera 20 in the first exemplary embodiment.

The communication portion 23 is an interface capable of performing communication with an apparatus such as the terminal apparatus 50 that is connected to the communication network 30, for example, via wireless communication. For example, the output portion 17 outputs information about a detected moving object to the terminal apparatus 50 via the communication portion 23.

A movement portion 24 is, for example, a device capable of moving the photographing apparatus 20A, which is fitted to the photographing apparatus 20A. The movement portion 24 may be, for example, a mobile body such as a drone and a robot. The movement portion 24 may be a drive device that is included in a mobile body and capable of moving the mobile body.

The control portion 22 is, for example, a controller that receives a movement instruction from the terminal apparatus 50 via the communication portion 23 and controls movement of the movement portion 24 according to the received instruction.

The photographing apparatus 20A may not include the communication portion 23. In that case, the photographing apparatus 20A is not connected to the movement portion 24.

The photographing apparatus 20A described above performs the same operation as the moving object detection apparatus 10 of the first exemplary embodiment.

Second Exemplary Embodiment

A second exemplary embodiment of the present disclosure will be described in detail with reference to drawings.
<<Description of Configuration>>

Figure 11:
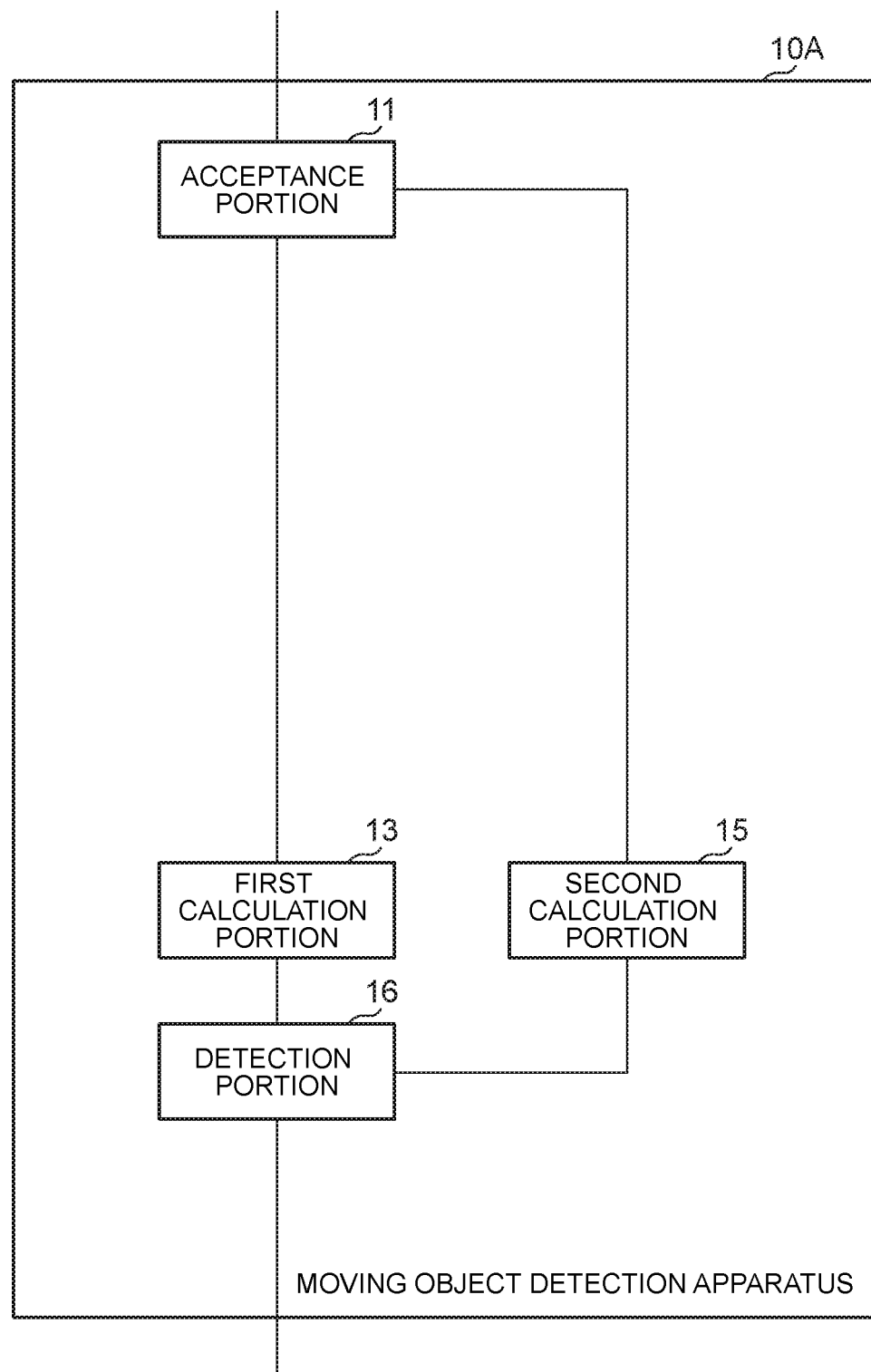
FIG. 11 is a block diagram illustrating an example of a configuration of a moving object detection apparatus according to a second exemplary embodiment of the present disclosure.

FIG. 11 is a block diagram illustrating an example of a configuration of a moving object detection apparatus 10A according to the second exemplary embodiment of the present disclosure.

When FIG. 11 is referred to, the moving object detection apparatus 10A is provided with the receiving portion 11, the first calculation portion 13, the second calculation portion 15 and the detection portion 16. The receiving portion 11 receives video taken by an image capturing apparatus provided in a mobile body (that is, the time-series images described above). The first calculation portion 13 calculates first moving-object scores based on motion of pixels of an image included in the video. The second calculation portion 15 calculates second moving-object scores based on a background model and the image, wherein the background model is updated based on the image and the motions of the pixels. The detection portion 16 detects a moving object from the image based on the first scores and the second scores.

<<Description of Operation>>

Operation of the moving object detection apparatus 10A of the present exemplary embodiment will be described in detail with reference to drawings.

Figure 12:
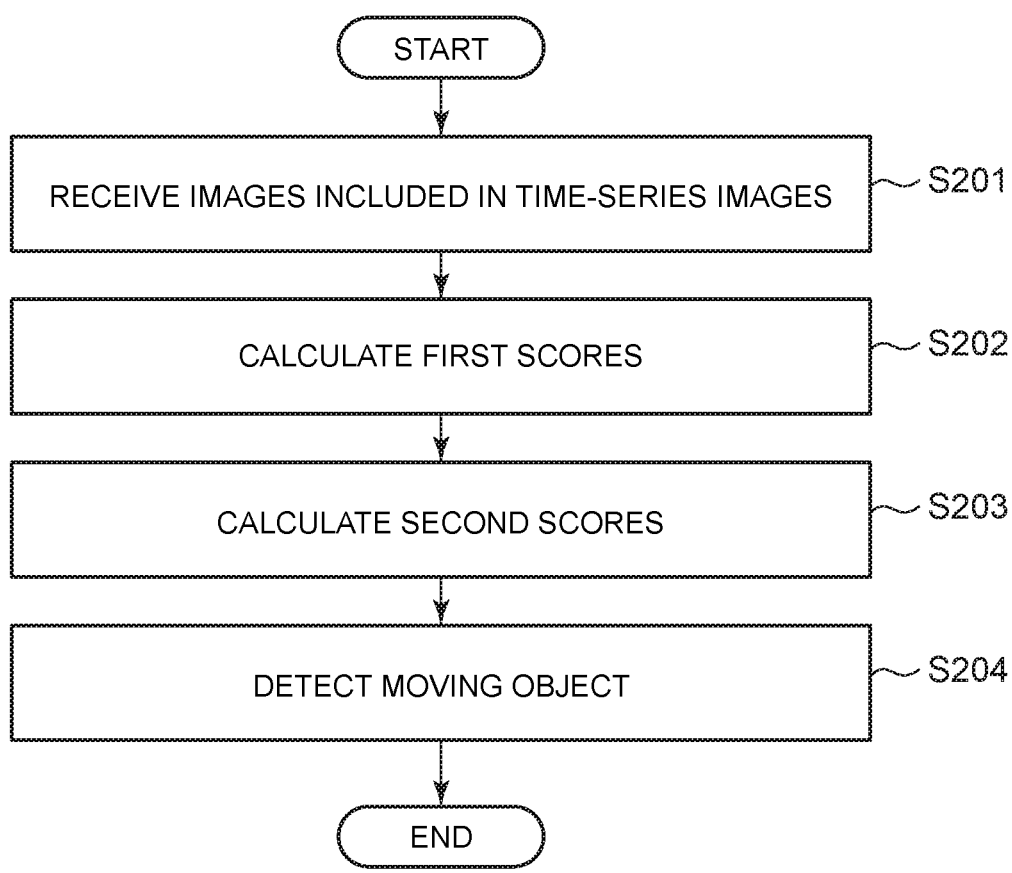
FIG. 12 is a flowchart illustrating an example of operation of the moving object detection apparatus according to the second exemplary embodiment of the present disclosure.

FIG. 12 is a flowchart illustrating an example of the operation of the moving object detection apparatus 10A according to the exemplary embodiment.

When FIG. 12 is referred to, the receiving portion 11 receives time-series images (step S201). The first calculation portion 13 calculates first moving-object scores based on motions of pixels of an image included in the time-series images (step S202). Furthermore, the second calculation portion 15 calculates second moving-object scores based on a background model, and the image, wherein the background model is updated based on the image and the motions of the pixels (step S203). The detection portion 16 detects a moving object from the image based on the first scores and the second scores (step S204).

Effect

The present exemplary embodiment described above has the same effect as the representative effect of the first exemplary embodiment. The reason is the same as the reason why the representative effect of the first exemplary embodiment occurs.

Other Exemplary Embodiments

The moving object detection apparatus according to each exemplary embodiment described above can be realized by a computer that includes a memory on which a program read out from a recording medium is loaded, and a processor that executes the program. The moving object detection apparatus according to each exemplary embodiment described above can be also realized by dedicated hardware. The moving object detection apparatus according to each exemplary embodiment described above can be also realized by a combination of the computer and dedicated hardware described above.

In other words, the moving object detection apparatus according to each exemplary embodiment described above can be realized by hardware such as a circuit configuration (a circuitry). The circuit configuration may be, for example, the processor and memory included in the computer. In that case, the program can be loaded on the memory. The program can be executed by the processor, and the computer can be operated as the moving object detection apparatus of each exemplary embodiment described above. The circuit configuration may be, for example, a plurality of computers that are communicably connected. The circuit configuration may be, for example, a circuit. The circuit configuration may be, for example, a plurality of circuits that are communicably connected. The circuit configuration may be a combination of one or more computers and one or more circuits that are communicably connected.

Figure 13:
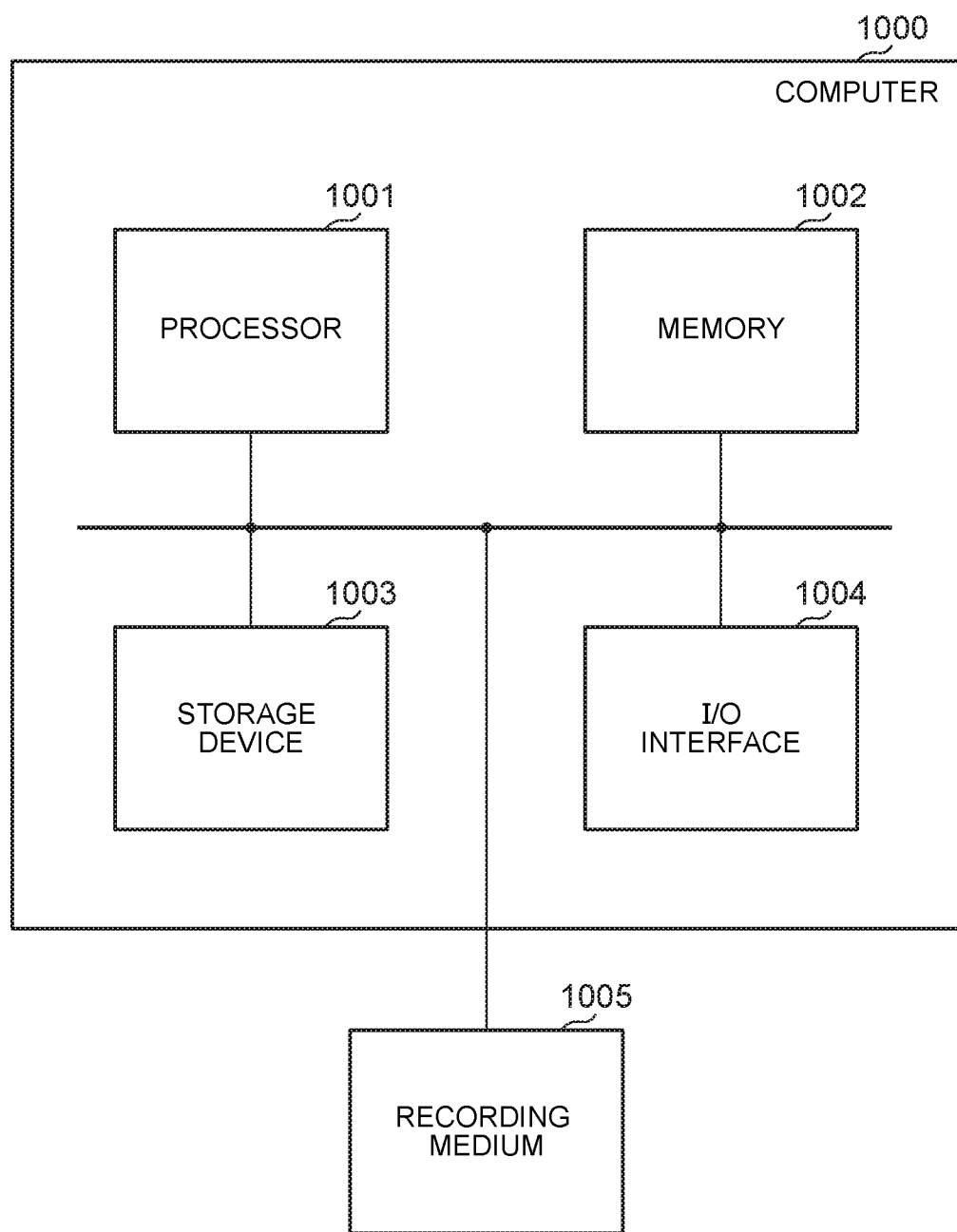
FIG. 13 is a diagram illustrating an example of a hardware configuration of a computer capable of realizing the moving object detection apparatuses according to the exemplary embodiments of the present disclosure.

FIG. 13 is a diagram illustrating an example of a hardware configuration of a computer 1000 capable of realizing the moving object detection apparatuses 10 and 10A. When FIG. 13 is referred to, the computer 1000 includes a processor 1001, a memory 1002, a storage device 1003 and an I/O (input/output) interface 1004. Further, the computer 1000 can access a recording medium 1005. The memory 1002 and the storage device 1003 are, for example, a RAM (random access memory) and a storage device such as a hard disk. The recording medium 1005 is, for example, a RAM, a storage device such as a hard disk, a ROM (read only memory), or a portable recording medium. The storage device 1003 may be the recording medium 1005. The processor 1001 can read and write data or a program from and to the memory 1002 and the storage device 1003. The processor 1001 can access an input device such as a camera, a server, a storage device and an output device such as a display via the I/O interface 1004. The processor 1001 can access the recording medium 1005. A program for causing the computer 1000 to operate as the moving object detection apparatus 10 is stored in the recording medium 1005. A program for causing the computer 1000 to operate as the moving object detection apparatus 10A may be stored in the recording medium 1005.

The processor 1001 loads the program for causing the computer 1000 to operate as the moving object detection apparatus 10, which is stored in the recording medium 1005, onto the memory 1002. Then, by the processor 1001 executing the program loaded onto the memory 1002, the computer 1000 operates as the moving object detection apparatus 10.

The processor 1001 loads the program for causing the computer 1000 to operate as the moving object detection apparatus 10A, which is stored in the recording medium 1005, onto the memory 1002. Then, by the processor 1001 executing the program loaded onto the memory 1002, the computer 1000 operates as the moving object detection apparatus 10A.

The receiving portion 11, the motion estimating portion 12, the first calculation portion 13, the background updating portion 14, the second calculation portion 15, the detection portion 16 and the output portion 17 can be realized, for example, by the processor 1001 that executes the program for realizing functions of these portions that has been loaded onto the memory 1002. Similarly, the representative point motion estimating portion 121, the background motion estimating portion 122 and the suppression portion 123 can be realized, for example, by the processor 1001 that executes the program for realizing functions of these portions that has been loaded onto the memory 1002. A part or all of the receiving portion 11, the motion estimating portion 12, the first calculation portion 13, the background updating portion 14, the second calculation portion 15, the detection portion 16 and the output portion 17 can be also realized by dedicated circuits that realize the functions of these portions. Similarly, a part or all of the representative point motion estimating portion 121, the background motion estimating portion 122 and the suppression portion 123 can be also realized by dedicated circuits that realize the functions of these portions.

Further, a part or all of the exemplary embodiments described above can be also described like supplementary notes below but are not limited to the supplementary notes below.

(Supplementary Note 1)

A moving object detection apparatus comprising: a processor configured to execute:

a receiving unit that receives video taken by an image capturing apparatus provided in a mobile body;

a first calculation unit that calculates first moving-object scores based on a motion of one or more pixels of an image included in the video;

a second calculation unit that calculates second moving-object scores based on a background model and the image, wherein the background model is updated based on the image and the motions of the pixels; and a detection unit that detects a moving object from the image based on the first scores and the second scores.

(Supplementary Note 2)

The moving object detection apparatus according to supplementary note 1, comprising:

a first motion estimation unit that estimates motions of pixels included in the video;

a second motion estimation unit that estimates motion of a background based on the motions of the pixels; and a suppression unit that estimates suppressed motions obtained by removing a component of the motion of the background from the motions of the pixels; wherein said first calculation unit calculates the first scores based on the suppressed motions.

(Supplementary Note 3)

The moving object detection apparatus according to supplementary note 1 or 2, further comprising an update unit that updates the background model based on transformation indicating the motion of the background.

(Supplementary Note 4)

The moving object detection apparatus according to any one of supplementary notes 1 to 3, wherein said first calculation unit calculates the first scores based on angles of the motions of the pixels between the images that are continuous in the video.

(Supplementary Note 5)

A moving object detection method comprising:

receiving video taken by an image capturing apparatus provided in a mobile body;

calculating first moving-object scores based on a motion of one or more pixels of an image included in the video;

calculating second moving-object scores based on a background model and the image, wherein the background model is updated based on the image and the motions of the pixels; and detecting a moving object from the image based on the first scores and the second scores.

(Supplementary Note 6)

The moving object detection method according to supplementary note 5, comprising:

estimating motions of pixels included in the video;

estimating motion of a background based on the motions of the pixels; and estimating suppressed motions obtained by removing a component of the motion of the background from the motions of the pixels; and calculating the first scores based on the suppressed motions.

(Supplementary Note 7)

The moving object detection method according to supplementary note 5 or 6, comprising updating the background model based on transformation indicating the motion of the background.

(Supplementary Note 8)

The moving object detection method according to any one of supplementary notes 5 to 7, comprising calculating the first scores based on angles of the motions of the pixels between the images that are continuous in the video.

(Supplementary Note 9)

A non-transitory computer readable medium having stored thereon a program causing a computer to execute:

a receiving process for receiving video taken by an image capturing apparatus provided in a mobile body;

a first calculation process for calculating first moving-object scores based on a motion of one or more pixels of an image included in the video;

a second calculation process for calculating second moving-object scores based on a background model and the image, wherein the background model is updated based on the image and the motions of the pixels; and a detection process for detecting a moving object from the image based on the first scores and the second scores.

(Supplementary Note 10)

The non-transitory computer readable medium according to supplementary note 9 causing the computer to execute:

a first motion estimation process for estimating motions of pixels included in the video;

a second motion estimation process for estimating motion of a background based on the motions of the pixels; and a suppression process for estimating suppressed motions obtained by removing a component of the motion of the background from the motions of the pixels; wherein said first calculation process calculates the first scores based on the suppressed motions.

(Supplementary Note 11)

The non-transitory computer readable medium according to supplementary note 9 or 10 causing the computer to execute: an update process for updating the background model based on transformation indicating the motion of the background.

(Supplementary Note 12)

The non-transitory computer readable medium according to any one of supplementary notes 9 to 11, wherein the first calculation process calculates the first scores based on angles of the motions of the pixels between the images that are continuous in the video.

The present disclosure has been described with reference to the exemplary embodiments. The present disclosure, however, is not limited to the above exemplary embodiments. It is possible to make various changes that can be understood by those skilled in the art within the scope of the present disclosure in the configurations and details of the present disclosure.

The present disclosure can be utilized for the purpose of surveillance by video from a camera mounted on a drone.

FIG. 1
10 MOVING OBJECT DETECTION APPARATUS
11 RECEIVING PORTION
12 MOTION ESTIMATING PORTION
121 REPRESENTATIVE POINT MOTION ESTIMATING PORTION
122 BACKGROUND MOTION ESTIMATING PORTION
123 SUPPRESSION PORTION
13 FIRST CALCULATION PORTION
14 BACKGROUND UPDATING PORTION
15 SECOND CALCULATION PORTION
16 DETECTION PORTION
17 OUTPUT PORTION
1 TIME-SERIES IMAGES
2 INFORMATION ABOUT MOVING OBJECT
FIG. 4
1 GRID SQUARE i
2 IMAGE
FIG. 5
1 GRID SQUARE i
2 DETECTED ABNORMAL POINTS
FIG. 6
1 FIRST SCORE
2 FIRST THRESHOLD
3 SECOND SCORE
4 SECOND THRESHOLD
5 MOVING OBJECT

FIG. 7
1 FIRST SCORE
2 FIRST THRESHOLD
3 SECOND SCORE
4 SECOND THRESHOLD
5 MOVING OBJECT
FIG. 8
1 FIRST SCORE
2 SECOND SCORE
3 MOVING OBJECT
FIG. 9
S101 START RECEPTION OF TIME-SERIES IMAGES
S102 RECEIVE IMAGES INCLUDED IN TIME-SERIES IMAGES
S103 MOVING OBJECT DETECTION PROCESS
S104 HAS RECEPTION OF TIME-SERIES IMAGES ENDED?
1 START
2 END
FIG. 10
S111 IS RECEIVED IMAGE FIRST IMAGE?
S112 ESTIMATE MOTIONS OF REPRESENTATIVE POINTS
S113 ESTIMATE MOTION OF BACKGROUND
S114 REMOVE COMPONENT OF MOTION OF BACKGROUND FROM MOTIONS OF REPRESENTATIVE POINTS
S115 CALCULATE FIRST SCORES
S116 UPDATE BACKGROUND MODEL
S117 CALCULATE SECOND SCORES
S118 DETECT MOVING OBJECT BASED ON FIRST SCORES AND SECOND SCORES
S119 OUTPUT MOVING OBJECT
S120 GENERATE BACKGROUND MODEL
1 START OF MOVING OBJECT DETECTION PROCESS
2 END OF MOVING OBJECT DETECTION PROCESS
FIG. 11
10A MOVING OBJECT DETECTION APPARATUS
11 RECEIVING PORTION
13 FIRST CALCULATION PORTION
15 SECOND CALCULATION PORTION
16 DETECTION PORTION
FIG. 12
S201 RECEIVE IMAGES INCLUDED IN TIME-SERIES IMAGES
S202 CALCULATE FIRST SCORES
S203 CALCULATE SECOND SCORES
S204 DETECT MOVING OBJECT
1 START
2 END
FIG. 13
1000 COMPUTER
1001 PROCESSOR
1002 MEMORY
1003 STORAGE DEVICE
1004 I/O INTERFACE
1005 STORAGE MEDIUM
FIG. 14
10 MOVING OBJECT DETECTION APPARATUS
20 CAMERA
310 COMMUNICATION NETWORK
40 MOBILE BODY
50 TERMINAL APPARATUS
60 OUTPUT DEVICE
FIG. 15
10 MOVING OBJECT DETECTION APPARATUS
20A PHOTOGRAPHING APPARATUS
21 PHOTOGRAPHING PORTION
22 CONTROL PORTION
23 COMMUNICATION PORTION
24 MOVEMENT PORTION
30 COMMUNICATION NETWORK
50 TERMINAL APPARATUS

What is claimed is:

1. A moving object detection apparatus comprising:
at least one memory that stores instructions; and
at least one processor configured to execute the instructions to:
receive video taken by an image capturing apparatus provided in a mobile body;
calculate first scores based on a motion of one or more pixels of an image included in the video;
calculate second scores based on a background model and the image, wherein the background model is updated based on the image and the motions of the pixels; and
detect an area of a moving object from the image based on the first scores and the second scores when at least any one of a first condition, a second condition and a third condition is satisfied, wherein
the first condition is that, in the area, the first scores satisfy a first score condition, the second scores satisfy a second score condition, or the first scores satisfy a first score condition and the second scores satisfy a second score condition,
the second condition is that, in the area, the first scores satisfy a first score condition and the second scores satisfy a second score condition,
the third condition is that, in the area, summations of the first scores and the second scores satisfy a third score condition, and
each of the first scores is based on an angle between a direction of a motion of a pixel in a previous image included in the video and a direction of a motion of a corresponding pixel in the image.

2. The moving object detection apparatus according to claim 1, wherein
the background model includes a mean and a variance of pixel values in a partial image of the image, and
each of the second scores is based on a proportion of a square value to the variance, wherein the square value is a square of a difference between a pixel value of a pixel and the mean in the background model of the partial area including the pixel.

3. A moving object detection method comprising:
receiving video taken by an image capturing apparatus provided in a mobile body;
calculating first scores based on a motion of one or more pixels of an image included in the video;
calculating second scores based on a background model and the image, wherein the background model is updated based on the image and the motions of the pixels; and
detecting an area of a moving object from the image based on the first scores and the second scores when at least any one of a first condition, a second condition and a third condition is satisfied, wherein
the first condition is that, in the area, the first scores satisfy a first score condition, the second scores satisfy a second score condition, or the first scores satisfy a first score condition and the second scores satisfy a second score condition, the second condition is that, in the area, the first scores satisfy a first score condition and the second scores satisfy a second score condition, the third condition is that, in the area, summations of the first scores and the second scores satisfy a third score condition, and each of the first scores is based on an angle between a direction of a motion of a pixel in a previous image included in the video and a direction of a motion of a corresponding pixel in the image.

4. The moving object detection method according to claim 3, wherein the background model includes a mean and a variance of pixel values in a partial image of the image, and each of the second scores is based on a proportion of a square value to the variance, wherein the square value is a square of a difference between a pixel value of a pixel and the mean in the background model of the partial area including the pixel.

5. A non-transitory computer readable storage medium storing a program causing a computer to execute:

processing of receiving video taken by an image capturing apparatus provided in a mobile body;

processing calculating first scores based on a motion of one or more pixels of an image included in the video;

processing calculating second scores based on a background model and the image, wherein the background model is updated based on the image and the motions of the pixels; and processing detecting an area of a moving object from the image based on the first scores and the second scores when at least any one of a first condition, a second condition and a third condition is satisfied, wherein the first condition is that, in the area, the first scores satisfy a first score condition, the second scores satisfy a second score condition, or the first scores satisfy a first score condition and the second scores satisfy a second score condition, the second condition is that, in the area, the first scores satisfy a first score condition and the second scores satisfy a second score condition, the third condition is that, in the area, summations of the first scores and the second scores satisfy a third score condition, and each of the first scores is based on an angle between a direction of a motion of a pixel in a previous image included in the video and a direction of a motion of a corresponding pixel in the image.

6. The storage medium according to claim 5, wherein the background model includes a mean and a variance of pixel values in a partial image of the image, and each of the second scores is based on a proportion of a square value to the variance, wherein the square value is a square of a difference between a pixel value of a pixel and the mean in the background model of the partial area including the pixel.

* * * * *

UNITED STATES PATENT AND TRADEMARK OFFICE
CERTIFICATE OF CORRECTION

PATENT NO. : 10,853,950 B2
APPLICATION NO. : 16/537733
DATED : December 1, 2020
INVENTOR(S) : Kengo Makino Page 1 of 1

It is certified that error appears in the above-identified patent and that said Letters Patent is hereby corrected as shown below:

In the Specification

Column 9, Detailed Description, Line 66; Delete "nomography." and insert --homography.-- therefor Column 25, Detailed Description, Line 64; Delete "310" and insert --30-- therefor Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*